(12) United States Patent
Mao

(10) Patent No.: US 11,089,455 B2
(45) Date of Patent: *Aug. 10, 2021

(54) NOTIFICATION MESSAGE MANAGEMENT METHOD, AND TERMINAL

(71) Applicant: Huawei Technologies Co., Ltd., Shenzhen (CN)

(72) Inventor: Yanyan Mao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,940

(22) Filed: Jul. 24, 2020

(65) Prior Publication Data

US 2020/0359183 A1 Nov. 12, 2020

Related U.S. Application Data

(63) Continuation of application No. 16/668,845, filed on Oct. 30, 2019, now Pat. No. 10,743,160, which is a
(Continued)

(51) Int. Cl.
*H04W 4/50* (2018.01)
*H04M 1/725* (2021.01)
(Continued)

(52) U.S. Cl.
CPC ............. *H04W 4/50* (2018.02); *H04L 51/24* (2013.01); *H04M 1/724* (2021.01); *H04M 1/725* (2013.01);
(Continued)

(58) Field of Classification Search
CPC ...... H04L 51/24; H04W 4/50; H04M 1/72563
See application file for complete search history.

(56) References Cited

U.S. PATENT DOCUMENTS 7,155,729 B1 12/2006 Andrew et al.
2010/0227600 A1 9/2010 Vander Veen et al.
(Continued)

FOREIGN PATENT DOCUMENTS

CN 103955474 A 7/2014
CN 104009910 A 8/2014
(Continued)

OTHER PUBLICATIONS

Kenta, A., et al., "Easy to Use Right Away, PLUS+ iPhone 6s/6s, Plus Complete Encyclopedia," First Edition, Japan, Gijutsu Hyoron Co. Ltd., Jan. 25, 2016, 18 pages.
(Continued)

*Primary Examiner* — David Bilodeau
(74) *Attorney, Agent, or Firm* — Conley Rose, P.C.

(57) ABSTRACT

A method includes detecting a user-input instruction for displaying a user interface for notification management and displaying the user interface for notification management. The user interface for notification management includes a classification option, receiving a user-input instruction for selecting the classification option, displaying at least two application types, detecting a user-input instruction for selecting an option of one application type of the at least two application types, displaying, in a same user interface, an identifier of at least one application corresponding to the selected application type displaying a setting option of a UI prompt manner of a notification message for each of the at least one application, detecting an operation of a user on the setting option of the UI prompt manner of the at least one application, and saving the setting option of the UI prompt manner of the at least one application after the user operation.

14 Claims, 24 Drawing Sheets

Related U.S. Application Data continuation of application No. 15/771,164, filed as application No. PCT/CN2016/094410 on Aug. 10, 2016, now Pat. No. 10,506,399.

(51) Int. Cl.
*H04M 1/724* (2021.01)
*H04M 1/72448* (2021.01)
*H04L 12/58* (2006.01)

(52) U.S. Cl.
CPC .... *H04M 1/72448* (2021.01); *H04M 2250/22* (2013.01)

(56) References Cited

U.S. PATENT DOCUMENTS

| | | |
|---|---|---|
| 2012/0304116 A1 | 11/2012 | Donahue et al. |
| 2013/0007665 A1 | 1/2013 | Chaudhri et al. |
| 2013/0241918 A1 | 9/2013 | Satyan |
| 2014/0179377 A1 | 6/2014 | Song et al. |
| 2014/0189533 A1 | 7/2014 | Krack et al. |
| 2014/0258883 A1 | 9/2014 | Duarte et al. |
| 2015/0046829 A1 | 2/2015 | Donahue et al. |
| 2015/0207916 A1 | 7/2015 | Xue et al. |
| 2015/0269009 A1 | 9/2015 | Faaborg et al. |
| 2016/0110059 A1 | 4/2016 | Li et al. |
| 2016/0255188 A1 | 9/2016 | Chaudhri et al. |
| 2016/0259489 A1* | 9/2016 | Yang ................... G09G 5/12 |
| 2016/0366569 A1 | 12/2016 | Wu et al. |
| 2017/0201850 A1 | 7/2017 | Raleigh et al. |
| 2017/0243465 A1 | 8/2017 | Bourne, Jr. et al. |
| 2017/0359439 A1 | 12/2017 | Beach et al. |
| 2018/0324567 A1 | 11/2018 | Mao |

FOREIGN PATENT DOCUMENTS

| | | |
|---|---|---|
| CN | 104360934 A | 2/2015 |
| CN | 104584488 A | 4/2015 |
| CN | 104598238 A | 5/2015 |
| CN | 104636142 A | 5/2015 |
| CN | 104778178 A | 7/2015 |
| CN | 104793938 A | 7/2015 |
| CN | 104834559 A | 8/2015 |
| CN | 104853043 A | 8/2015 |
| CN | 105094814 A | 11/2015 |
| CN | 105100483 A | 11/2015 |
| CN | 105228109 A | 1/2016 |
| CN | 105511719 A | 4/2016 |
| CN | 105677313 A | 6/2016 |
| CN | 107925694 B | 2/2020 |
| JP | 2011082887 A | 4/2011 |
| JP | 2014519126 A | 8/2014 |
| WO | 2012170446 A2 | 12/2012 |
| WO | 2013184530 A1 | 12/2012 |
| WO | 2015103967 A1 | 7/2015 |

OTHER PUBLICATIONS

"Windows 10 Perfect Complete," Japan, Shinyusha Co. Ltd., Aug. 1, 2016, 5 pages.

"How to Manage Interception of Notification Information in the Notification Bar of Android Phones," Baidu, Apr. 21, 2016, 14 pages.

Mpercent,"How to Disable Notification Badge in Samsung Mobiles", URL:https://www.ampercent.com/how-to-disable-notification-badge-in-samsung-mobiles/17156/, Timespan for capture of this URL: Oct. 25, 2015-Nov. 25, 2020, 3 pages.

Jugal Jagtap, et al., "How to add custom notifications for different apps in S6 Edge," URL:https://forums.androidcentral.com/samsung-galaxy-s6-edge/557222-how-add-custom-notifications-different-apps-s6-edge.html, Jul. 2015, 3 pages.

Howtogeek.com Online Technology Magazine, "How to hide sensitive notifications on Android lock screen," URL: http://www.howtoip.com/how-to-hide-sensitive-notifications-on-your-android-lock-screen/, May 14, 2016, 18 pages.

Samsung, "How to hide the lock screen notification content on Samsung Galaxy C5 Pro SM-05010 (6.0.1)?," URL: https://www.samsung.com/cn/support/mobile-devices/galaxy-c5-pro-sm-c5010-how-to-hide-notice-content-of-locking-screen, Last update date: Oct. 5, 2020, 8 pages.

Ring.com, "Checking Notification Settings on an iPhone," URL:https://www.youtube.com/watch?v=DxNcRI-UJeA, Oct. 16, 2015, A total of 1 minute 01 seconds of video.

* cited by examiner

|  | Block at a time | Notification panel | Banner | Badge | Lockscreen notification |
|---|---|---|---|---|---|
| SMS message | On | On | On | On | Off |
| Email | Off | On | On | On | On |
| Browser | On | On | On | Off | Off |
| Game | Off | On | On | On | Off |
| Taobao | Off | On | Off | Off | Off |
| Music | Off | On | On | Off | Off |
| Photo | Off | On | On | Off | On |

FIG. 3C

NOTIFICATION MESSAGE MANAGEMENT METHOD, AND TERMINAL

CROSS-REFERENCE TO RELATED APPLICATION

This is a continuation of U.S. patent application Ser. No. 16/668,845, filed on Oct. 30, 2019, which is a continuation of U.S. patent application Ser. No. 15/771,164, filed on Apr. 26, 2018 and now U.S. Pat. No. 10,506,399, which is a national stage of International Patent Application No. PCT/CN2016/094410, filed on Aug. 10, 2016. All of the aforementioned applications are hereby incorporated by reference in their entireties.

TECHNICAL FIELD

The present disclosure relates to the communications field, and further, to a notification message management method and a terminal.

BACKGROUND

At present, use of a mobile phone is becoming more common. In addition to some applications (for example, dialing, a short message service (SMS) message, a calendar, a radio, an application store) provided in an operating system, the mobile phone itself may further install, according to a user instruction, an application (for example, a social application, a bank application, a shopping application) provided by a third-party application developer. Many applications provide a notification message to notify a user that content, a condition, or the like of the application has been updated. The mobile phone offers a plurality of ways to prompt the notification message, for example, a visual prompt, a voice prompt, and a vibration prompt. The visual prompt includes displaying the notification message on a screen of the mobile phone (that is, reminding using a user interface), or performing a prompt using luminance of an indicator light on the mobile phone, and so on.

In other approaches, a prompt manner of the notification message for the application can be set in an automatic or a manual manner. An automatic setting manner (such as Chinese Patent Application Publication 105228109) includes that the mobile phone determines, according to a usage habit of the user or content of an application prompt message, whether to instantly prompt, or determines an importance level of the notification message according to a relationship between a received notification message and a current user interface (such as Chinese Patent Application Publication 104584488), and different importance levels correspond to different prompt manners. However, the user cannot voluntarily make a choice in this setting manner, and an actual requirement of the user is not necessarily met.

In a manual setting manner, the mobile phone provides a user interface for notification management in order to manage a prompt manner of an application notification message. The user interface for notification management shown in FIG. 1A is used as an example. 101 indicates a status bar, and the status bar 101 includes a mobile network signal icon, an operator icon, a WiFi icon, a time, a remaining battery power percentage, and a battery icon from left to right successively. The user interface for notification management displays several applications such as a calendar, an email, music, a radio, an SMS message, and a theme. The bottom of FIG. 1A further includes a navigation bar 102, and the navigation bar 102 includes a button used to hide the navigation bar, a back button, a home button, and an overview button from left to right successively.

After the user taps a calendar option according to FIG. 1B, the mobile phone may enter a user interface of FIG. 1C, and the user may set, in this interface, whether to allow a notification of the calendar, whether to allow a preferential prompt of the calendar, and whether to enable three reminding manners of the calendar.

However, after the user sets, in FIG. 1C, a prompt manner of a notification message for one application, if the user wants to set a prompt manner of a notification message for another application, the user needs to return to the user interface shown in FIG. 1A and then select the other application. Therefore, efficiency of this manner for managing the notification message is not high, and especially when the user sets prompt manners of notification messages for a plurality of applications, operations are cumbersome.

SUMMARY

Embodiments of the present disclosure provide a notification message management method and a terminal in order to improve efficiency of managing a notification message and simplify a user operation.

According to a first aspect, an embodiment of the present disclosure provides a method, used for a terminal, where at least one application that is capable of providing a notification message is installed on the terminal, and the method includes: detecting a user-input instruction for displaying a user interface (UI) for notification management (the instruction may be tapping a "setting" icon on a desktop of the terminal, and so on); displaying the user interface for notification management, where the user interface for notification management includes a classification option (such as a "classification" button); receiving a user-input instruction for selecting the classification option; displaying options of at least two application types; detecting a user-input instruction for selecting an option of one application type of the at least two application types; displaying, in a same user interface, an identifier of at least one application corresponding to the selected application type and displaying a setting option of a UI prompt manner of a notification message for each of the at least one application; detecting an operation of a user on the setting option of the UI prompt manner of the at least one application; and saving the setting option of the UI prompt manner of the at least one application after the user operation.

Optionally, the setting option herein is used to enable or disable one or several UI prompt manners of the notification message. When subsequently receiving a new notification message, the terminal may determine, according to the setting option herein, whether the notification message needs to be prompted, and which manner is used for prompting. Because in this method, an application is classified according to the application type, after selecting one application type, the user may set, in one interface, notification messages of all applications corresponding to the application type in order to reduce a user switching operation between user interfaces and improve operation efficiency of managing the notification message.

Optionally, the foregoing steps of detecting the instruction for displaying the user interface for notification management, accessing the user interface for displaying notification management, and receiving the user instruction for selecting the classification option may be omitted. The terminal may detect a user-input instruction (for example, the instruction may be an instruction for sliding to a center along one edge of a screen, or another specific gesture), in another interface (for example, a home interface, a lockscreen interface), for displaying an interface for classification, and then display the options of the at least two application types and subsequent steps.

In a first possible implementation of the first aspect, the application type is classifying an application according to the UI prompt manner of the notification message for the application. In this implementation, classifying the application according to a commonly-seen UI prompt manner is provided, so that a user may set in batches the applications that use a same UI prompt manner of the notification message. The user may choose, in a same user interface, to enable or disable the UI prompt manner of the notification message in order to filter the applications that use the UI prompt manner of the notification message. Therefore, the user operation is simpler.

In a second possible implementation of the first aspect, the application type includes at least two of the following: blocking all notification messages for the application at a time, a lockscreen notification, a banner, a badge, a notification panel, a rolling notification, or a Toast. An application corresponding to blocking all notification messages for the application at a time may enable or disable all UI prompts of a notification message for the application using one switch. The application may be selected by the user, or may be set by a mobile phone vendor or an application provider. For the setting option of the UI prompt manner of the notification message for the application corresponding to the application type, refer to the content in Table 1. Optionally, the application type includes only the lockscreen notification, the banner, the badge, and the notification panel.

In a third possible implementation of the first aspect, the application type is classifying an application according to frequency that the application provides the notification message (that is, classifying an application according to a quantity of times the application provides the notification message in a period of time), or the application type is classifying an application according to frequency that the notification message for the application is read (that is, classifying an application according to a quantity of times the notification message for the application is read in a period of time), or the application type is classifying an application according to the prompt manner of the notification message currently being prompted. In this implementation, another classification manner is further provided such that a management manner of the notification message is more diversified, and a user requirement is more easily met.

In a fourth possible implementation of the first aspect, after the saving the setting option of the UI prompt manner of the at least one application after the user operation, the method further includes: receiving a new notification message; searching for an identifier of an application of the new notification message; determining a UI prompt manner of the new notification message according to the saved setting option of the UI prompt manner of the at least one application and the identifier of the application of the new notification message; and prompting the new notification message according to the UI prompt manner of the new notification message. A setting result of the notification message in this implementation is applied to a prompt of the terminal for a next notification message.

According to a second aspect, an embodiment of the present disclosure provides a method, used for a terminal, where at least one application that is capable of providing a notification message is installed on the terminal, and the method includes: detecting a user-input instruction for displaying a UI for notification management; displaying the user interface for notification management, where the user interface for notification management includes a classification option; detecting a user-input instruction for selecting the classification option; displaying an option of a first UI prompt manner and an option of a second UI prompt manner, where the first UI prompt manner is different from the second UI prompt manner; detecting an instruction of a user for selecting the option of the first UI prompt manner; displaying in a same user interface: an identifier of a first application corresponding to the first UI prompt manner, an identifier of a second application corresponding to the first UI prompt manner, whether to disable a toggle of the first UI prompt manner of a notification message for the first application, and whether to disable a toggle of the second UI prompt manner of a notification message for the second application; detecting an operation of the user for disabling the first UI prompt manner of the first application and an operation of the user for disabling the first UI prompt manner of the second application; and saving a setting that the first UI prompt manner of the first application is disabled and a setting that the first UI prompt manner of the second application is disabled. This implementation provides a method for setting a prompt manner of a notification message for a same type of application. The application is classified into at least two types according to the prompt manner of the notification message. The user may complete setting of the application corresponding to the first UI prompt manner in the same interface, that is, determine whether the application subsequently further needs to continue to use the first UI prompt manner to prompt the notification message. Therefore, the setting manner is relatively highly efficient, and the user operation is simple.

Optionally, the foregoing steps of detecting the instruction for displaying the user interface for notification management, accessing the user interface for displaying notification management, and receiving the user instruction for selecting the classification option may be omitted. The terminal may detect a user-input instruction (for example, the instruction may be an instruction for sliding to a center along one edge of a screen, or may be another specific gesture), in another interface, for displaying an interface for classification, then display the option of the first UI prompt manner and the option of the second UI prompt manner, and perform subsequent steps.

In a first possible implementation of the second aspect, the first UI prompt manner is any one of a lockscreen notification, a banner, a badge, a notification panel, a rolling notification, or a Toast, and the second UI prompt manner is any one of a lockscreen notification, a banner, a badge, a notification panel, a rolling notification, or a Toast. In this implementation, the user may set in batches some applications that use a same commonly-seen UI prompt manner, and this setting manner is closer to a user requirement.

According to a third aspect, an embodiment of the present disclosure provides a method, used for a terminal, where at least one application that is capable of providing a notification message is installed on the terminal, and the method includes: detecting a user-input instruction for displaying a UI for notification management; displaying the user interface for notification management, where the user interface for notification management includes a classification option; detecting a user-input instruction for selecting the classification option; displaying options of at least two application types, where the application type is classifying an application according to frequency that a notification message for the application is read; detecting a user-input instruction for selecting an option of one application type of the at least two application types; displaying, in a same user interface, an identifier of at least one application corresponding to the selected application type and displaying whether to disable a toggle of all UI prompt manners of a notification message for each of the at least one application; detecting an operation of a user for disabling all UI prompt manners of notification messages for some applications of the at least one application; and saving a setting that all the UI prompt manners of the notification messages for some applications are disabled. In this method, a specific notification message management manner is provided such that the user may enable or disable all UI prompt manners of a notification message for a commonly-used or seldom-used application at a time according to a usage habit of the user. Especially a notification message for an application that is not commonly used by the user, all UI prompts of the notification message may be blocked at a time in order to reduce interference to the user.

Optionally, the foregoing steps of detecting the instruction for displaying the user interface for notification management, accessing the user interface for displaying notification management, and receiving the user instruction for selecting the classification option may be omitted. The terminal may detect a user-input instruction (for example, the instruction may be an instruction for sliding to a center along one edge of a screen, or another specific gesture), in another interface, for displaying an interface for classification, and then display the options of the at least two application types and subsequent steps.

In a first possible implementation of the third aspect, after the saving a setting that all the UI prompt manners of the notification messages for some applications are disabled, the method further includes: receiving a new notification message; and if the new notification message corresponds to one application of some applications, blocking a UI prompt of the new notification message. In this implementation, that the terminal processes a subsequently received notification message is provided.

According to a fourth aspect, an embodiment of the present disclosure provides a terminal, including: a touch panel; a display panel; a memory; at least one processor; and at least one application that is capable of providing a notification message and one or more programs, where the one or more programs are stored in the memory and configured to be executed by the one or more processors, the one or more programs include an instruction, and the instruction is used to: detect a user-input instruction for displaying a UI for notification management; display the user interface for notification management, where the user interface for notification management includes a classification option; receive a user-input instruction for selecting the classification option; display options of at least two application types; detect a user-input instruction for selecting an option of one application type of the at least two application types; display, in a same user interface, an identifier of at least one application corresponding to the selected application type and display a setting option of a UI prompt manner of a notification message for each of the at least one application; detect an operation of a user on the setting option of the UI prompt manner of the at least one application; and save the setting option of the UI prompt manner of the at least one application after the user operation. The terminal corresponds to the method in the first aspect, a related description of the first aspect is also applicable to the terminal, and details are not repeated herein.

Optionally, the foregoing steps of detecting the instruction for displaying the user interface for notification management, accessing the user interface for displaying notification management, and receiving the user instruction for selecting the classification option may be omitted. The instruction may be used to: detect a user-input instruction (for example, the instruction may be an instruction for sliding to a center along one edge of a screen, or another specific gesture), in another interface, for displaying an interface for classification, and then display the options of the at least two application types and subsequent steps.

In the first to the fourth implementations of the fourth aspect, the terminals corresponding to the first to the fourth implementations of the first aspect are respectively provided, related descriptions in the first to the fourth implementations of the first aspect are also applicable to the terminals in the first to the fourth implementations of the fourth aspect, and details are not repeated herein.

According to a fifth aspect, an embodiment of the present disclosure provides a terminal, including: a touch panel; a display panel; a memory; at least one processor; and at least one application that is capable of providing a notification message and one or more programs, where the one or more programs are stored in the memory and configured to be executed by the one or more processors, the one or more programs include an instruction, and the instruction is used to: detect a user-input instruction for displaying a UI for notification management; display the user interface for notification management, where the user interface for notification management includes a classification option; detect a user-input instruction for selecting the classification option; display an option of a first UI prompt manner and an option of a second UI prompt manner, where the first UI prompt manner is different from the second UI prompt manner; detect an instruction of a user for selecting the option of the first UI prompt manner; display in a same user interface: an identifier of a first application corresponding to the first UI prompt manner, an identifier of a second application corresponding to the first UI prompt manner, whether to disable a toggle of the first UI prompt manner of a notification message for the first application, and whether to disable a toggle of the second UI prompt manner of a notification message for the second application; detect an operation of the user for disabling the first UI prompt manner of the first application and an operation of the user for disabling the first UI prompt manner of the second application; and save a setting that the first UI prompt manner of the first application is disabled and a setting that the first UI prompt manner of the second application is disabled. The terminal corresponds to the method in the second aspect, a related description of the second aspect is also applicable to the terminal, and details are not repeated herein.

Optionally, the foregoing steps of detecting the instruction for displaying the user interface for notification management, accessing the user interface for displaying notification management, and receiving the user instruction for selecting the classification option may be omitted. The instruction may be used to: detect a user-input instruction (for example, the instruction may be an instruction for sliding to a center along one edge of a screen, or may be another specific gesture), in another interface, for displaying an interface for classification, and then display the option of the first UI prompt manner, the option of the second UI prompt manner, and subsequent steps.

In a first implementation of the fifth aspect, the terminal corresponding to the first implementation of the second aspect is provided, a related description in the first implementation of the second aspect is also applicable to the terminal in the first implementation of the fifth aspect, and details are not repeated herein.

According to a sixth aspect, an embodiment of the present disclosure provides a terminal, including: a touch panel; a display panel; a memory; at least one processor; and at least one application that is capable of providing a notification message and one or more programs, where the one or more programs are stored in the memory and configured to be executed by the one or more processors, the one or more programs include an instruction, and the instruction is used to: detect a user-input instruction for displaying a UI for notification management; display the user interface for notification management, where the user interface for notification management includes a classification option; detect a user-input instruction for selecting the classification option; display options of at least two application types, where the application type is classifying an application according to frequency that a notification message for the application is read; detect a user-input instruction for selecting an option of one application type of the at least two application types; display, in a same user interface, an identifier of at least one application corresponding to the selected application type and display whether to disable a toggle of all UI prompt manners of a notification message for each of the at least one application; detect that a user disables all UI prompt manners of notification messages for some applications of the at least one application; and save a setting that all the UI prompt manners of the notification messages for some applications are disabled. The terminal corresponds to the method in the third aspect, a related description of the third aspect is also applicable to the terminal, and details are not repeated herein.

Optionally, the foregoing steps of detecting the instruction for displaying the user interface for notification management, accessing the user interface for displaying notification management, and receiving the user instruction for selecting the classification option may be omitted. The instruction may be used to: detect a user-input instruction (for example, the instruction may be an instruction for sliding to a center along one edge of a screen, or another specific gesture), in another interface, for displaying an interface for classification, and then display the options of the at least two application types and subsequent steps.

In a first implementation of the sixth aspect, the terminal corresponding to the first implementation of the third aspect is provided, a related description in the first implementation of the third aspect is also applicable to the terminal in the first implementation of the sixth aspect, and details are not repeated herein.

According to a seventh aspect, an embodiment of the present disclosure provides a computer-readable storage medium that stores one or more programs, where the one or more programs include an instruction, and when being executed by a terminal that includes a touch panel, a display panel, and a plurality of applications, the instruction enables the terminal to perform the method according to any one of the first aspect, or the first to the fourth implementations of the first aspect.

According to an eighth aspect, an embodiment of the present disclosure provides a computer-readable storage medium that stores one or more programs, where the one or more programs include an instruction, and when being executed by a terminal that includes a touch panel, a display panel, and a plurality of applications, the instruction enables the terminal to perform the method according to the second aspect, or the first implementation of the second aspect.

According to a ninth aspect, an embodiment of the present disclosure provides a computer-readable storage medium that stores one or more programs, where the one or more programs include an instruction, and when being executed by a terminal that includes a touch panel, a display panel, and a plurality of applications, the instruction enables the terminal to perform the method according to the third aspect, or the first implementation of the third aspect.

According to another aspect, an embodiment of the present disclosure further provides a graphical user interface of a terminal, where the terminal includes a touch panel, a display panel, a memory, a plurality of applications, and one or more processors configured to execute one or more programs stored in the memory, and the graphical user interface includes: a user interface configured to display notification management, a user interface configured to display two application types, and a user interface configured to display an identifier of at least one application corresponding to an application type selected by a user and a setting option of a UI prompt manner of a notification message for each of the at least one application, where the user interface displaying notification management includes a classification option; responding to a detected user-input instruction for displaying a UI for notification management, the user interface configured to display notification management starts to display; responding to a detected user-input instruction for selecting the classification option, the user interface configured to display the options of the at least two application types starts to display; responding to a detected user-input instruction for selecting one application type of the at least two application types, the user interface configured to display the identifier of the at least one application corresponding to the selected application type and the setting option of the UI prompt manner of the notification message for each of the at least one application starts to display; and responding to an operation of a user on the setting option of the UI prompt manner of the at least one application, displaying of the user interface configured to display the identifier of the at least one application corresponding to the selected application type and the setting option of the UI prompt manner of the notification message for each of the at least one application is changed. The changed displaying herein refers to changing at least one of a color, a shape, a size, luminance, or transparency of the setting option of the UI prompt manner of the notification message for the at least one application according to the operation of the user on the setting option of the UI prompt manner of the at least one application. The graphical user interface corresponds to the method in the first aspect, and a corresponding description is also applicable to the graphical user interface.

The foregoing user interface configured to display notification management is optional. Responding to a user-input instruction for displaying an interface for classification in another interface (such as a home interface or a lockscreen interface), the user interface configured to display the options of the at least two application types starts to display.

According to another aspect, an embodiment of the present disclosure further provides a graphical user interface of a terminal, where the terminal includes a touch panel, a display panel, a memory, a plurality of applications, and one or more processors configured to execute one or more programs stored in the memory, and the graphical user interface includes: a user interface configured to display notification management, a user interface configured to display an option of a first UI prompt manner and an option of a second UI prompt manner, and a user interface configured to display an identifier of at least one application corresponding to an application type and display whether to disable a toggle of all UI prompt manners of a notification message for each of the at least one application, where responding to a detected user-input instruction for displaying a UI for notification management, the user interface configured to display notification management starts to display; responding to a detected user-input instruction for selecting the classification option, the user interface configured to display the option of the first UI prompt manner and the option of the second UI prompt manner starts to display; responding to a detected user-input instruction for selecting the option of the first UI prompt manner, the user interface configured to display the identifier of the at least one application corresponding to the application type and display whether to disable the toggle of all the UI prompt manners of the notification message for each of the at least one application starts to display; and responding to an operation of a user for disabling the first UI prompt manner of the first application and an operation of the user for disabling the first UI prompt manner of the second application, displaying of the user interface configured to display the identifier of the at least one application corresponding to the application type and display whether to disable the toggle of all the UI prompt manners of the notification message for each of the at least one application is changed. The changed displaying herein includes: according to the operation of the user for disabling the first UI prompt manner of the first application and the operation of the user for disabling the first UI prompt manner of the second application, changing at least one of a color, a shape, luminance, or transparency of a toggle of all UI prompt manners of the notification message for the first application, and changing at least one of a color, a size, a shape, luminance, or transparency of a toggle of all UI prompt manners of the notification message for the second application. The graphical user interface corresponds to the method in the second aspect, and a corresponding description is also applicable to the graphical user interface.

The foregoing user interface configured to display notification management is optional. Responding to a user-input instruction for displaying an interface for classification in another interface (such as a home interface or a lockscreen interface), the user interface configured to display the option of the first UI prompt manner and the option of the second UI prompt manner starts to display.

According to another aspect, an embodiment of the present disclosure further provides a graphical user interface of a terminal, where the terminal includes a touch panel, a display panel, a memory, a plurality of applications, and one or more processors configured to execute one or more programs stored in the memory, and the graphical user interface includes: a user interface configured to display notification management, a user interface configured to display options of at least two application types, and a user interface configured to display an identifier of at least one application corresponding to an application type selected by a user and display a setting option of a UI prompt manner of a notification message for each of the at least one application, where responding to a detected user-input instruction for displaying a UI for notification management, the user interface configured to display notification management starts to display; responding to a user-input instruction for selecting the classification option, the user interface configured to display the options of the at least two application types starts to display; responding to a user-input instruction for selecting an option of one application type of the at least two application types, the user interface configured to display the identifier of the at least one application corresponding to the application type selected by the user and display the setting option of the UI prompt manner of the notification message for each of the at least one application starts to display; and responding to an operation of the user on the setting option of the UI prompt manner of the at least one application, displaying of the user interface configured to display the identifier of the at least one application corresponding to the application type selected by the user and the setting option of the UI prompt manner of the notification message for each of the at least one application is changed. The changed displaying herein includes: changing at least one of a color, a shape, a size, luminance, or transparency of the setting option of the UI prompt manner of the notification message for the at least one application according to the operation of the user on the setting option of the UI prompt manner of the at least one application. The graphical user interface corresponds to the method in the third aspect, and a corresponding description is also applicable to the graphical user interface.

The foregoing user interface configured to display notification management is optional. Responding to a user-input instruction for displaying an interface for classification in another interface (such as a home interface or a lockscreen interface), the user interface configured to display the options of the at least two application types starts to display.

According to another aspect, an embodiment of the present disclosure further provides a notification message management method, used for a terminal, where at least one application that is capable of providing a notification message is installed on the terminal, and the method includes: detecting a user-input instruction for displaying a UI for notification management; displaying the user interface for notification management, where the user interface for notification management includes a classification option; detecting a user-input instruction for selecting the classification option; displaying options of at least two application types, where the application type is classifying an application according to a UI prompt manner of a notification message currently being displayed; detecting a user-input instruction for selecting an option of a first application type of the at least two application types; displaying, in a same user interface, an identifier of at least one application corresponding to the first application type and displaying a cancel button corresponding to each of the at least one application, where the cancel button is used to cancel a UI prompt that corresponds to the first application type and that is of a notification message of a corresponding application; detecting an operation of a user for canceling a UI prompt of notification messages for some applications of the at least one application; and canceling the UI prompt that corresponds to the first application type and that is of the notification messages for some applications. This method enables the user to cancel, according to a UI prompt manner, prompts in batches for the notification message that is performing the UI prompt. This eliminates a trouble that the user performs an operation on a single application, and improves efficiency of canceling a prompt of a notification message. Optionally, the application type includes a badge or a notification panel.

Optionally, the foregoing steps of detecting the instruction for displaying the user interface for notification management, accessing the user interface for displaying notification management, and receiving the user instruction for selecting the classification option may be omitted. The terminal may detect a user-input instruction (for example, the instruction may be an instruction for sliding to a center along one edge of a screen, or another specific gesture), in another interface, for displaying an interface for classification, and then display the options of the at least two application types and subsequent steps.

According to another aspect, an embodiment of the present disclosure provides a terminal, including a touch panel, a display panel, a memory, at least one processor, and at least one application that is capable of providing a notification message and one or more programs, where the one or more programs are stored in the memory and configured to be executed by the one or more processors, the one or more programs include an instruction, and the instruction is used to execute the method provided in the foregoing another aspect.

According to another aspect, an embodiment of the present disclosure further provides a graphical user interface of a terminal, where the terminal includes a touch panel, a display panel, a memory, a plurality of applications, and one or more processors configured to execute one or more programs stored in the memory, and the graphical user interface includes: a user interface configured to display notification management, a user interface configured to display options of at least two application types, and a user interface configured to display an identifier of at least one application corresponding to the first application type and display a cancel button corresponding to each of the at least one application, where responding to a detected user-input instruction for displaying a UI for notification management, the user interface configured to display notification management starts to display; responding to a user-input instruction for selecting the classification option, the user interface displaying the options of the at least two application types starts to display; responding to a user-input instruction for selecting an option of the first application type of the at least two application types, the user interface configured to display the identifier of the at least one application corresponding to the application type selected by the user and display the setting option of the UI prompt manner of the notification message for each of the at least one application starts to display; and responding to an operation of the user for canceling the UI prompt of the notification messages for some applications of the at least one application, displaying of the user interface configured to display the identifier of the at least one application corresponding to the application type selected by the user and the setting option of the UI prompt manner of the notification message for each of the at least one application is changed. The changed displaying herein includes: changing at least one of a color, a shape, a size, luminance, or transparency of the setting option of the UI prompt manner of the notification messages for some applications according to the operation of the user for canceling the UI prompt of the notification messages for some applications of the at least one application. The graphical user interface corresponds to the method in the third aspect, and a corresponding description is also applicable to the graphical user interface.

The foregoing user interface configured to display notification management is optional. Responding to a user-input instruction for displaying an interface for classification in another interface (such as a home interface or a lockscreen interface), the user interface configured to display the options of the at least two application types starts to display.

Based on the foregoing technical solutions, the terminal may provide the user with a simpler notification message management method and user interface with higher efficiency such that the user implements batch management of the application according to the application type. In addition, the terminal may provide the user with more personalized choices, for example, classifying the application according to the prompt manner of the notification message.

BRIEF DESCRIPTION OF DRAWINGS

FIG. 3C is a table of a UI prompt manner of a notification message for an application according to an embodiment of the present disclosure;

DESCRIPTION OF EMBODIMENTS

Figure 1A:
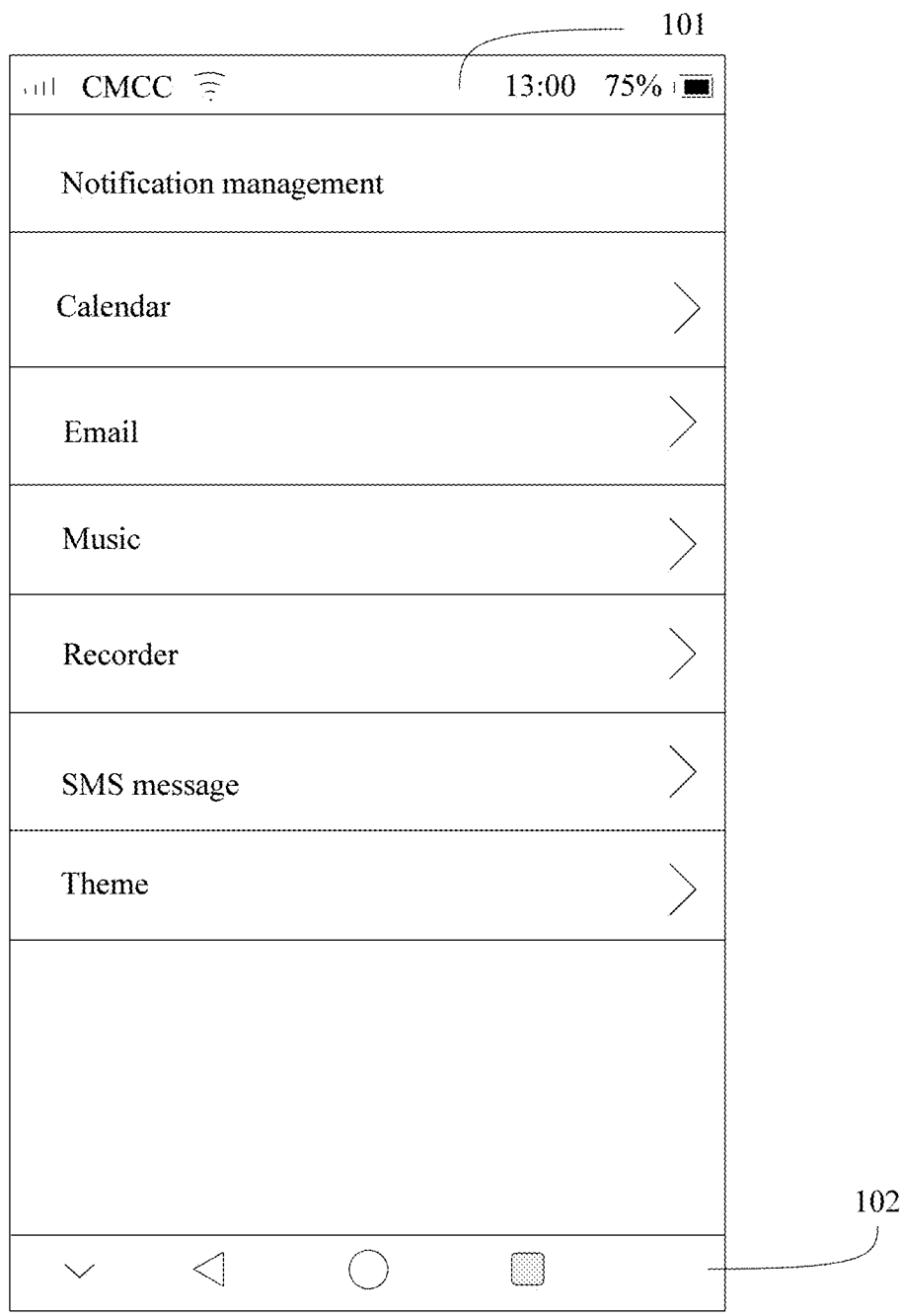
FIG. 1A is a schematic diagram of a user interface for notification management of a mobile phone.
Figure 1B:
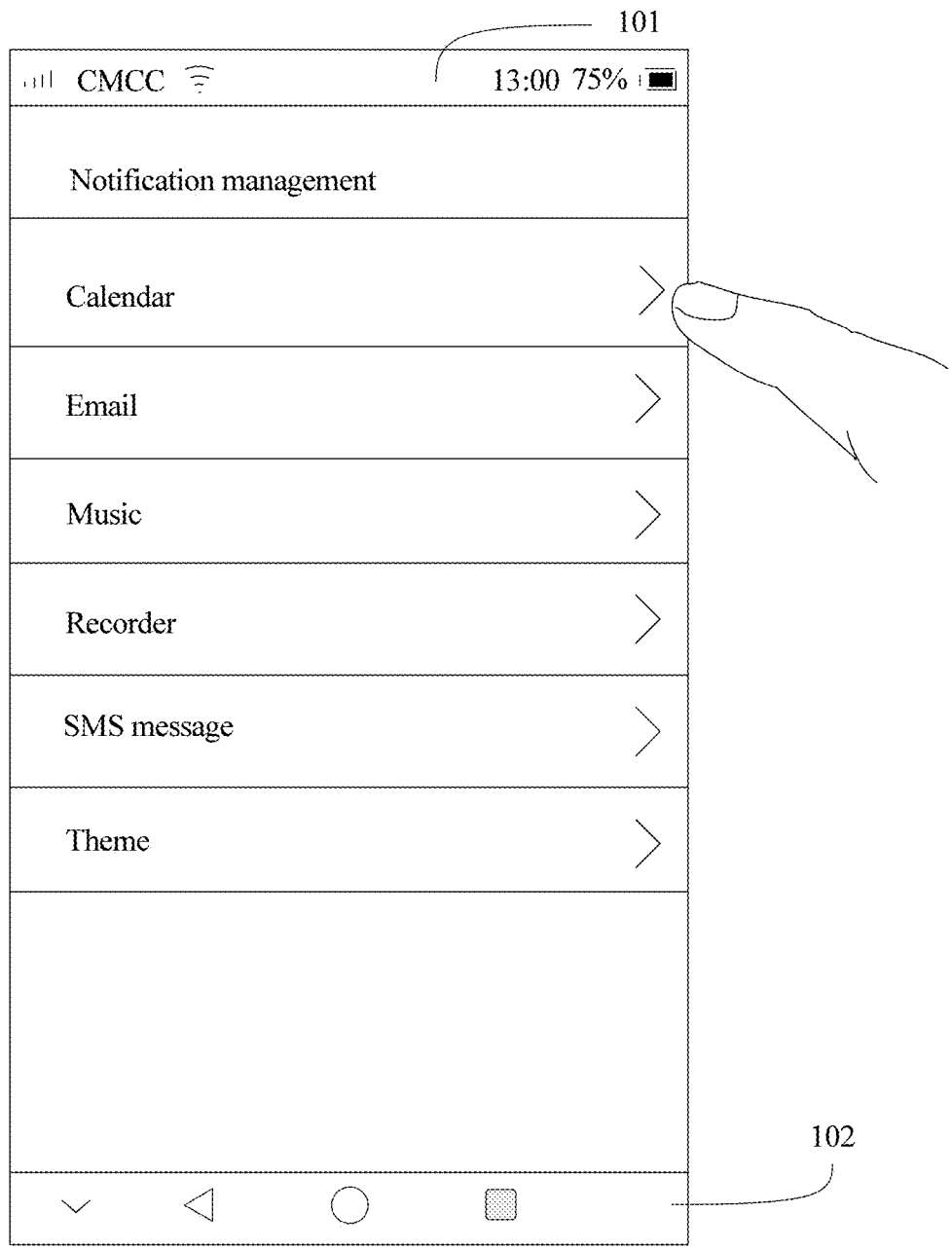
FIG. 1B is a schematic diagram of performing an operation on a user interface for notification management in FIG. 1A of a mobile phone.
Figure 1C:
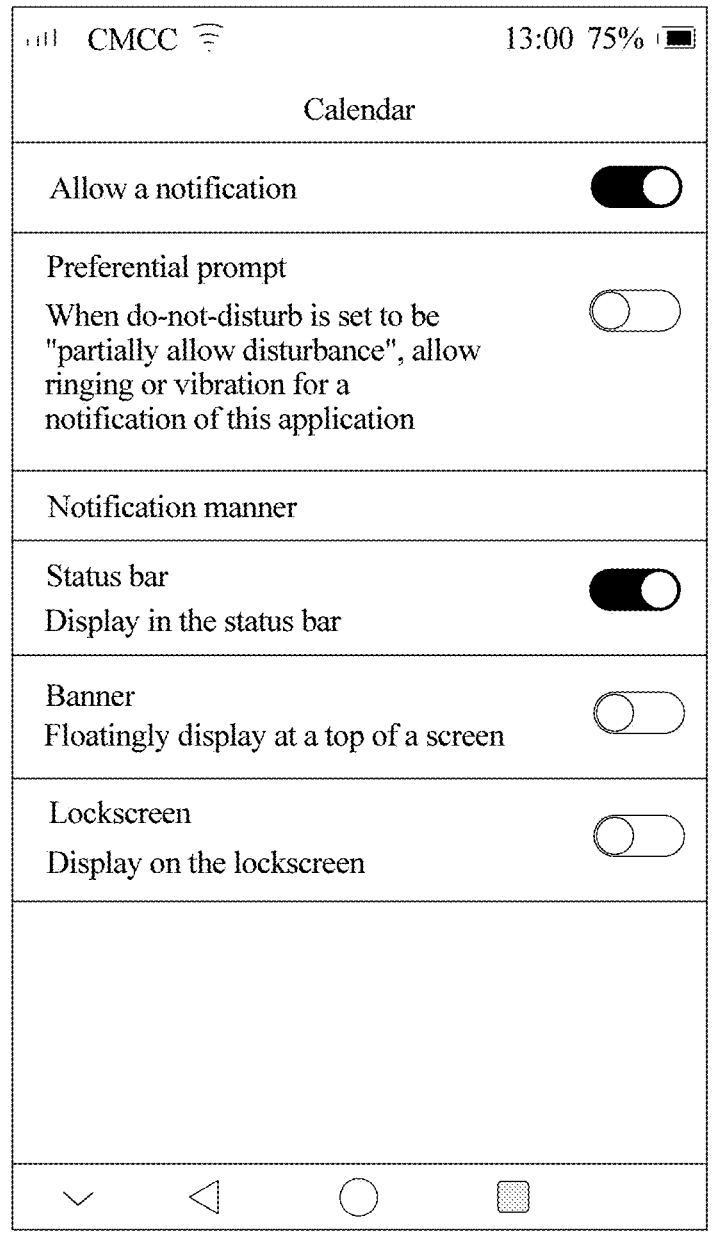
FIG. 1C is a schematic diagram of a user interface for setting a calendar notification of a mobile phone.

To make the objectives, technical solutions, and advantages of the present disclosure clearer, the following further describes the present disclosure in detail with reference to the accompanying drawings.

A terminal in embodiments of the present disclosure includes a mobile phone, a tablet computer, a Personal Digital Assistant (PDA), a Point of Sales (POS), or the like. At least one application is installed on the terminal, and the application may provide a notification message. If the terminal may receive a notification message from an external application A or the terminal generates a notification message of an application A according to local information, the application A may provide the notification message.

The notification message for the application in the embodiments of the present disclosure is used to notify a user of some information about the application, the notification message may be a digest of the information, or the information itself, and occasionally the notification message further includes a sender of the information, a sending time, an application icon, or the like. For example, a notification message for an SMS application may notify the user that the terminal receives a new SMS message, or has successfully sent an SMS message. A notification message for a dialing application may notify the user that the terminal has several missed calls. A notification message for an application market may notify the user that new versions of some applications may be downloaded. A notification message for a calendar application may notify the user that a specified reminding time is already reached, and so on. The notification message may be from an application server (for example, a notification message sent by a game server), or may be generated by a processor of the terminal (for example, a notification message for the calendar application), and a source of the notification message is not limited in the embodiments of the present disclosure.

The "option" in the embodiments of the present disclosure includes a button (such as 421) in a UI, a sub-item (such as 401) in a table, or the like. When the user selects an "option", the terminal displays a user interface corresponding to the option. For example, a pop-up window is superimposed in a user interface displayed before the selection operation, or a user interface displayed before the selection operation is switched to the user interface corresponding to the option. Alternatively, when the user performs a setting operation on a toggle in an "option", at least one of a color, a shape, a size, luminance, or transparency of the toggle in the "option" is changed.

The notification message in the embodiments of the present disclosure may be prompted in a plurality of manners. A visual reminder further includes displaying the notification message on a screen of the mobile phone, that is, the notification message is prompted using the user interface. A manner of prompting the notification message using the user interface, that is, a UI prompt manner of the notification message, further includes at least one of the following: (1) a banner, that is, a heads-up notification, (2) a lockscreen notification, (3) a badge, (4) a notification panel, (5) a rolling notification, (6) a toast, or the like.

Figure 2A:
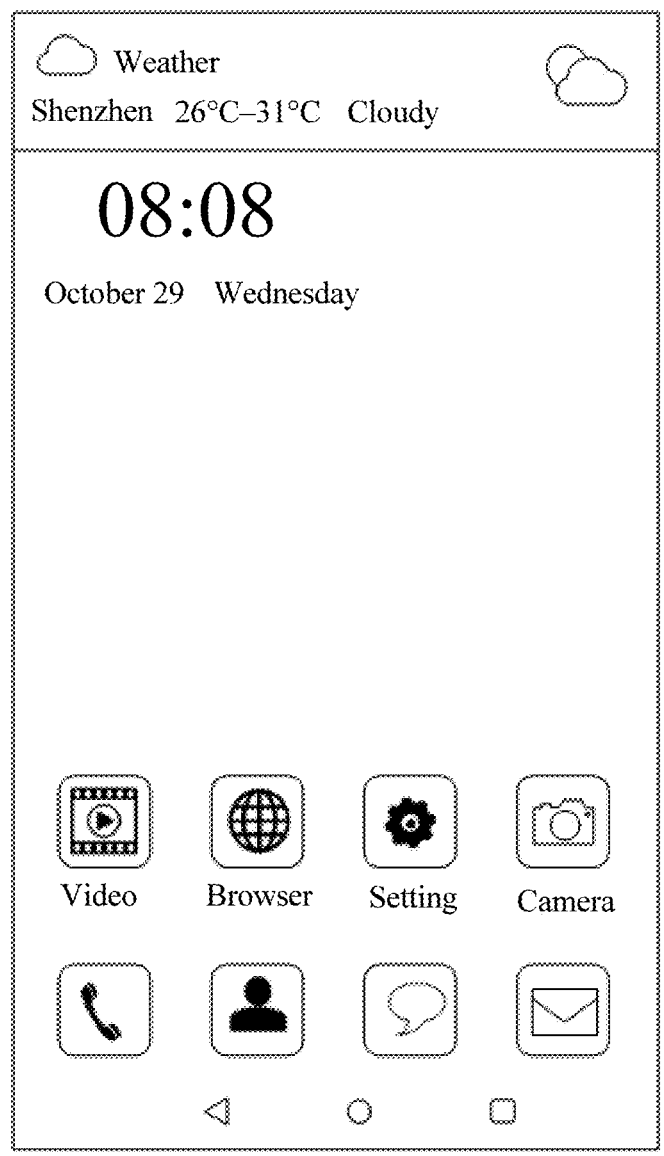
FIG. 2A is a schematic diagram of a user interface that uses a banner to display a notification message.

The heads-up notification is generally that a small floating window is displayed on a screen top of a non-lockscreen interface to prompt the user such that the user quickly responds to the notification without exiting a current browsing interface. The heads-up notification may support slideup for clear and slidedown into the notification panel, and may further display some operation options, such as answering a call or rejecting a call. For example, as shown in FIG. 2A, at the top of a home interface, a notification message for a weather application is displayed in a heads-up notification manner.

Figure 2B:
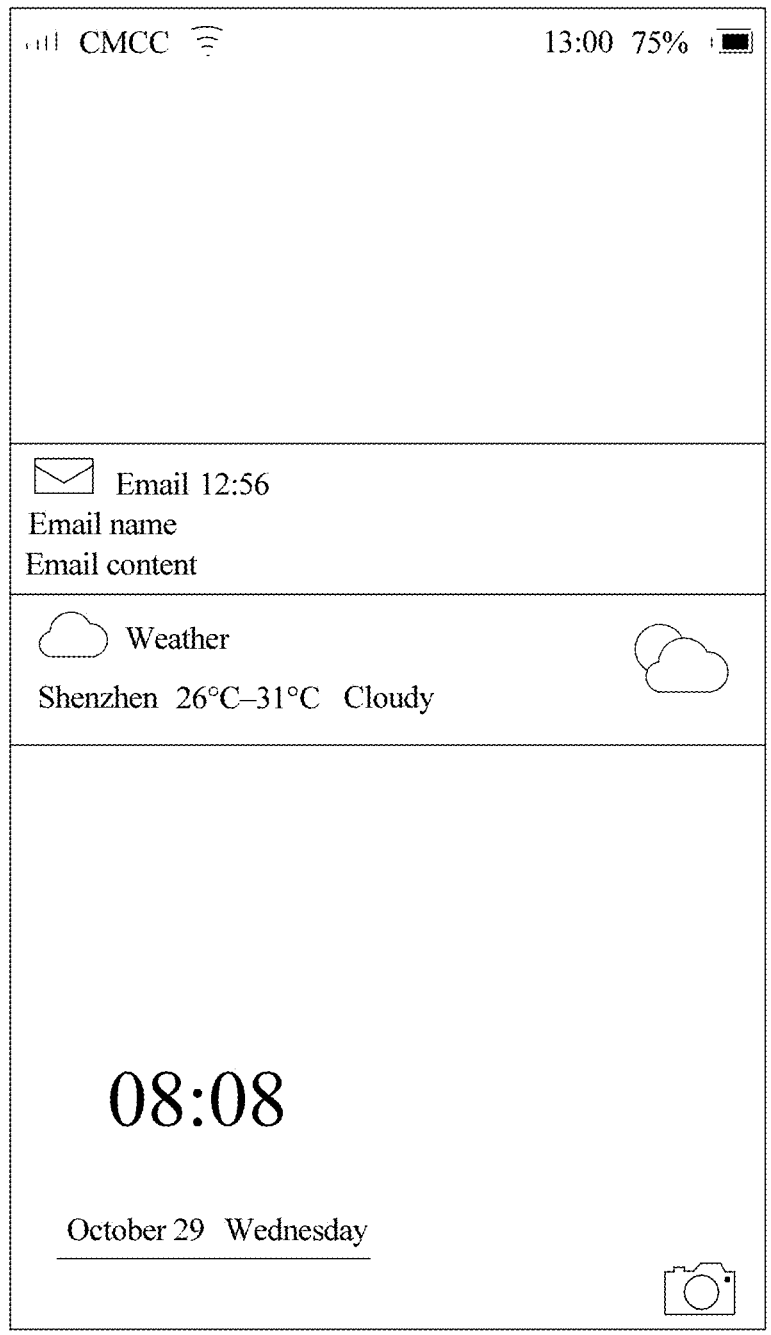
FIG. 2B is a schematic diagram of a user interface of a lockscreen notification.

The lockscreen notification is a notification displayed in a lockscreen interface. For example, a notification message for an email application and the notification message for the weather application are displayed in the middle of the lockscreen interface shown in FIG. 2B.

Figure 2C:
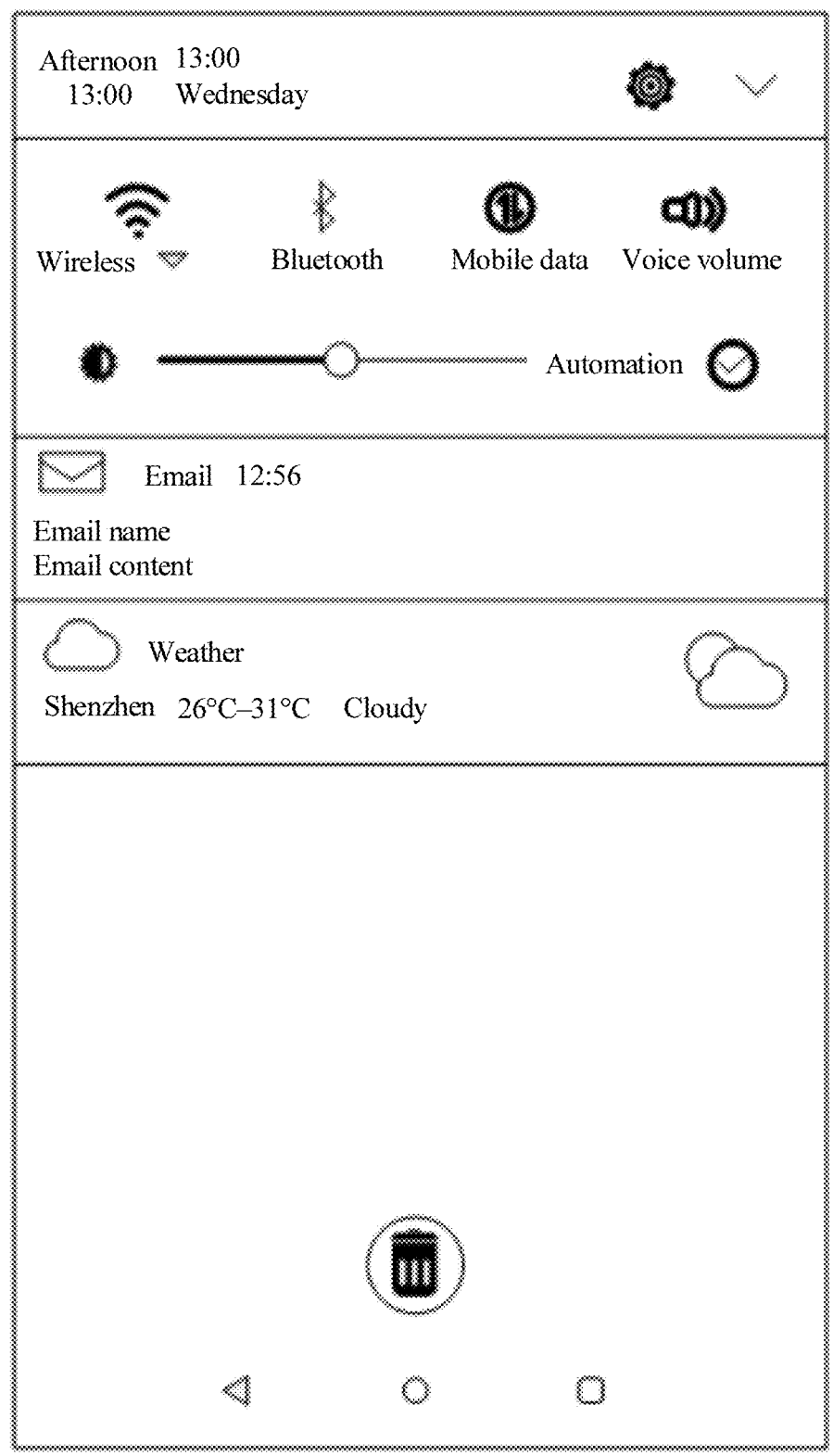
FIG. 2C is a schematic diagram of a user interface that displays a notification message on a notification panel.

A prompt manner of the notification panel allows the user to view detailed information about a notification after a drawer type notification panel is displayed. For example, FIG. 2C shows a user interface of a notification panel. In addition to including some commonly-seen setting options, the interface of the notification panel further includes the notification message for the email application and the notification message for the weather application. One or more notification messages may be deleted using a garbage box button at the bottom of the interface.

Figure 2D:
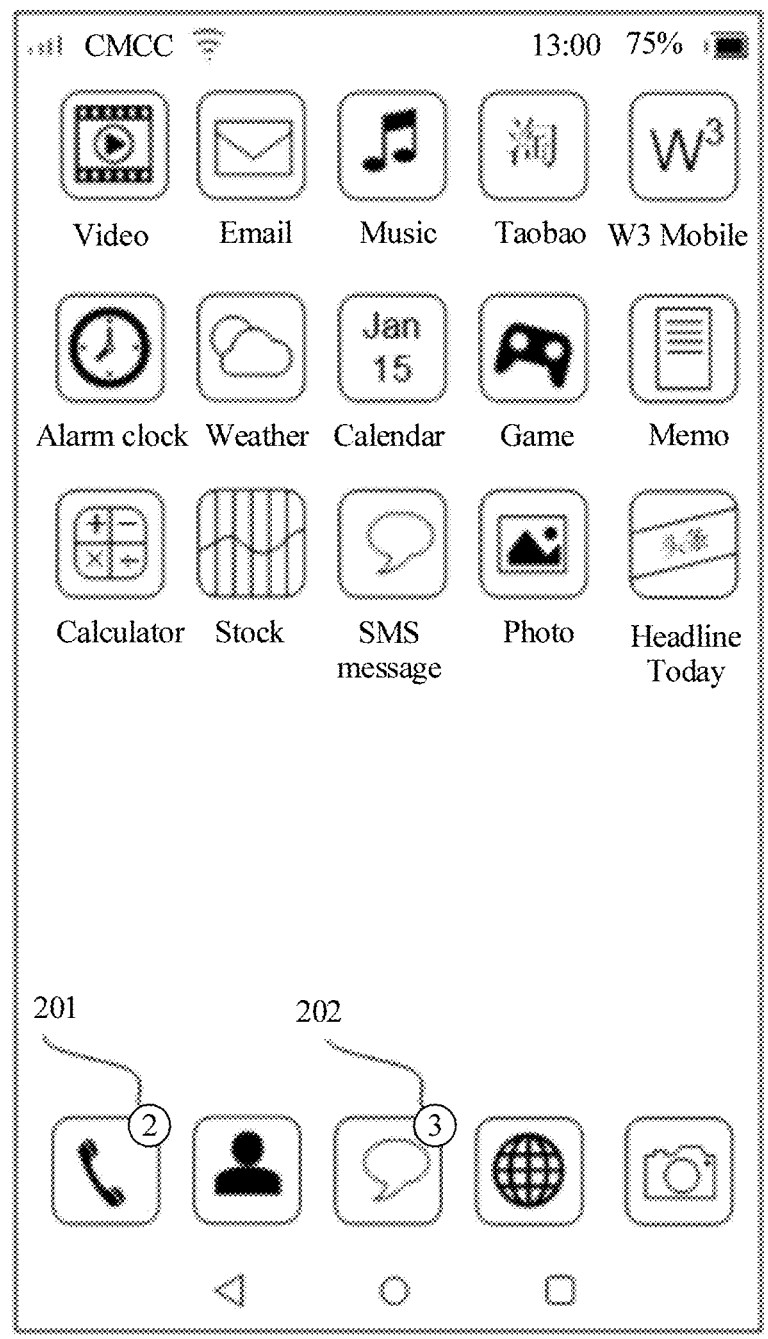
FIG. 2D is a schematic diagram of a user interface that uses a badge to display a notification message.

A prompt manner of the badge is generally to display a quantity of notification messages in an upper right corner of an application icon. For example, as shown in FIG. 2D, a badge 201 in an upper right corner of a phone icon is 2, indicating that there are two missed calls, and a badge 202 in an upper right corner of an SMS message icon is 3, indicating that there are three unread SMS messages.

The toast is generally a floating window that pops up from the bottom of the screen of the non-lockscreen interface, and is used to prompt a brief notification message, but cannot display some operation options. A position of the toast may also be in another position of the screen.

The rolling notification is generally in a status bar or another position of the screen of the non-lockscreen interface, and content of the notification message is displayed in a rolling manner.

There are many implementations to determine the prompt manner of the notification message. In addition to the content described in the background, there are some other implementations such as a method provided in Chinese Patent Application Publication 104636142, in which push messages with different purposes may be pushed according to different time periods. Notifications received by various applications in last ten days may be counted, and an application table and a notification message received by each application are displayed in an interface for notification management such that the user may determine whether to block a notification of an application or notifications of several applications. However, this notification management manner is still based on a single application, and does not classify the application. Therefore, setting efficiency is not high.

In addition, there further is a method provided in Chinese Patent Application Publication 104598238, in which an application program table, for example, a news type, a game type, and an instant messaging type, may be arranged, and classification management is performed. The user may select "reserve a social type", and in this case, message pushing reminding of a social program is enabled, and a message pushing service of another application program is disabled. When the user taps a "restore all" button, an intelligent terminal cancels a notification blocking function for a third-party application program, and a message pushing function of the third-party application program is enabled. However, this notification management manner is based on application classification, but the classification can only be based on whether the application belongs to the news type, the social type, or the instant messaging type. This manner of classification for batch management is relatively singular, and is not diversified enough, and still does not necessarily meet an actual requirement of the user.

The terminal in the embodiments of the present disclosure classifies applications into at least two categories based on the UI prompt manner of the notification message for the application, or based on frequency that the notification message for the application is opened by the user, or according to a quantity of the notification message for the application in a period of time, or according to a prompt manner of a notification message currently being prompted. The terminal can display all application types under a same classification criterion. When the user selects an application type, the terminal displays all applications of the application type in a same user interface, and each displayed application has an option of at least one UI prompt manner. In the user interface, the user may set, in batches using the option, the prompt manner of the notification message for all the applications that belong to a same application classification, without a need to switch a plurality of times between several interfaces. Therefore, the setting manner of the notification message in the embodiments of the present disclosure enables the user to voluntarily make a choice, and the setting manner is relatively diversified, setting efficiency is higher, and operation is easier.

It should be further understood that although the terms such as "first" and "second" may be used to describe various application types or UI prompt manners in this specification, the application types or UI prompt manners should not be limited by the terms. The terms are merely used to distinguish one application type from another application type, or distinguish one UI prompt manner from another UI prompt manner.

Figure 3A:
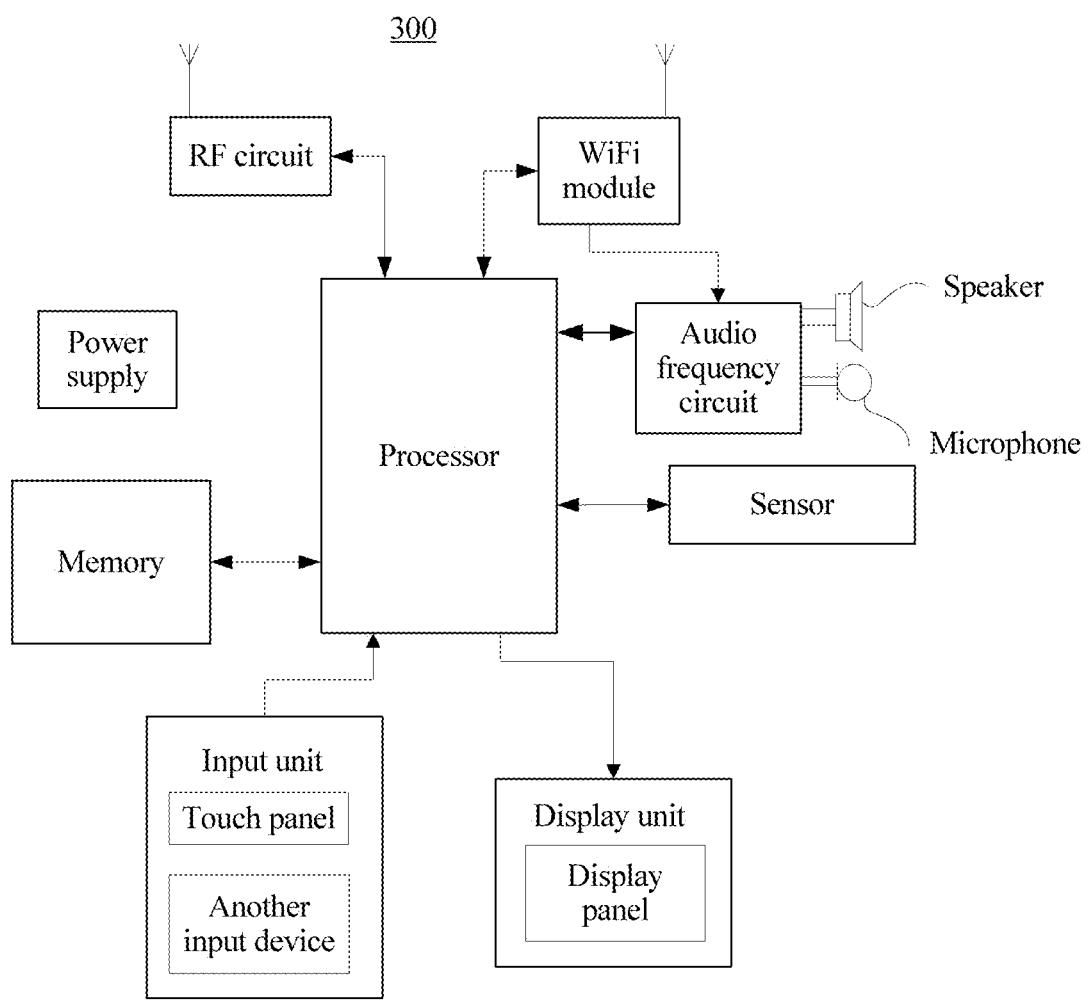
FIG. 3A is a schematic structural diagram of hardware of a mobile phone.

FIG. 3A is a schematic structural diagram of a mobile phone 300 according to an embodiment of the present disclosure. The mobile phone 300 includes components such as a radio frequency (RF) circuit, a memory, an input unit, a display unit, a sensor, an audio frequency circuit, a WiFi module, a processor, and a power supply. Persons skilled in the art may understand that the structure of the mobile phone shown in FIG. 3A imposes no limitation on the mobile phone, and the mobile phone may include more or fewer components than those shown in the figure, or may combine some components, or have different component arrangements. The following further describes the components of the mobile phone 300 with reference to FIG. 3A.

The RF circuit is configured to receive or send a signal in an information receiving or sending process or a call process, for example, a notification message for an application. In particular, after receiving downlink information of a base station, the RF circuit sends the downlink information to the processor for processing, and in addition, sends designed uplink data to the base station. Generally, the RF circuit includes but is not limited to an antenna, at least one amplifier, a transceiver, a coupler, a low noise amplifier (LNA), a duplexer, or the like. In addition, the RF circuit 110 may communicate with a network and another device by means of wireless communication. Any communications standard or protocol may be used for the wireless communication, including but not limited to: Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory is configured to store a program and a module, and the processor runs the software program and the module that are stored in the memory in order to invoke components such as the input unit (a touch panel) and the display unit (a display panel) to execute various functional applications of the mobile phone and perform data processing. The memory may mainly include a program storage area and a data storage area. The program storage area may store an operating system, an application required by at least one function (such as a sound playing function, an image playing function, a dialing function, or an SMS message receiving or sending function), and the like; and the data storage area may store data (such as the notification message for the application or a UI prompt manner of the notification message) created according to use of the mobile phone 300, and the like. In addition, the memory may include a high-speed random access memory, and may further include a nonvolatile memory such as at least one magnetic disk storage component, a flash memory component, or another volatile solid-state storage component.

The input unit is configured to: receive input numeral or character information, and generate key signal input related to a user setting of the mobile phone 300 and function control of the mobile phone 300. In an embodiment, the input unit may include the touch panel and another input device. The touch panel, also referred to as a touchscreen, may collect a touch operation (for example, an operation performed by a user on the touch panel or near the touch panel using any proper object or accessory such as a finger or a stylus) of the user on or near the touch panel, and drive a corresponding connection apparatus according to a preset program. The touch panel includes two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor, and can receive and execute a command sent by the processor. In addition, the touch panel may be implemented in a plurality of types, such as a resistive type, a capacitive type, infrared, or a surface acoustic wave. The input unit may further include the other input device in addition to the touch panel. In an embodiment, the other input device may include but is not limited to one or more of a physical keyboard, a function key (such as a volume control key or an on/off key), a trackball, a mouse, a joystick, or the like.

The display unit is configured to display information that is input by the user or information (such as the notification message) provided for the user, and various operation interfaces of the mobile phone 100. The display unit may include the display panel. Optionally, the display panel may be configured using a liquid crystal display (LCD), an organic light-emitting diode (OLED), or the like. Further, the touch panel may cover the display panel. When detecting the touch operation on or near the touch panel, the touch panel sends the touch operation to the processor to determine a type of a touch event, and then the processor provides corresponding visual output on the display panel according to the type of the touch event. Although in FIG. 3A, the touch panel and the display panel are used as two independent modules to implement input and input functions of the mobile phone 300, in some embodiments, the touch panel and the display panel may be integrated to implement the input and output functions of the mobile phone 300. The display panel in this embodiment of the present disclosure is configured to separately display, according to different instructions of the user, a user interface for notification management, a user interface that includes an application type, and a user interface that includes all applications of a same application type and a setting option of a UI prompt manner of a notification message for an application. The touch panel is configured to receive a user-input instruction (such as taping and selecting a "classification" option) for accessing a classification interface and a user-input instruction for accessing a UI prompt manner setting interface of notification messages for all the applications of an application type.

Figure 3B:
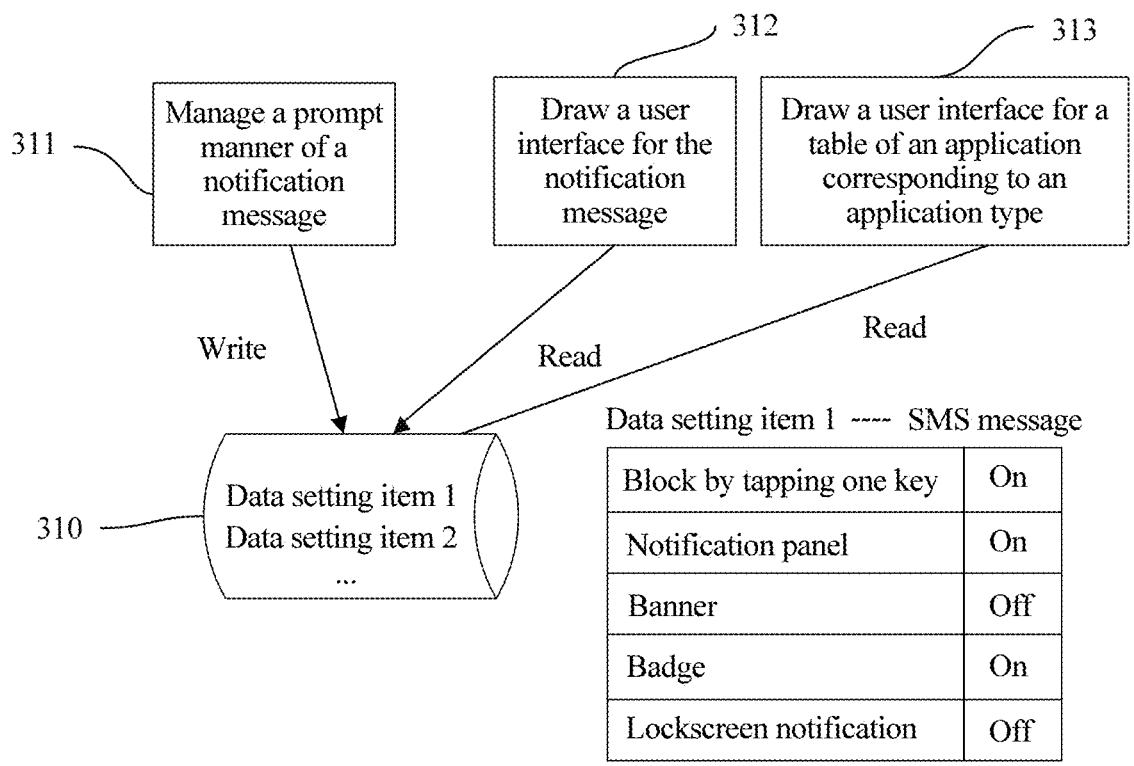
FIG. 3B is a schematic diagram of a notification message management method according to an embodiment of the present disclosure.
Figure 4A:
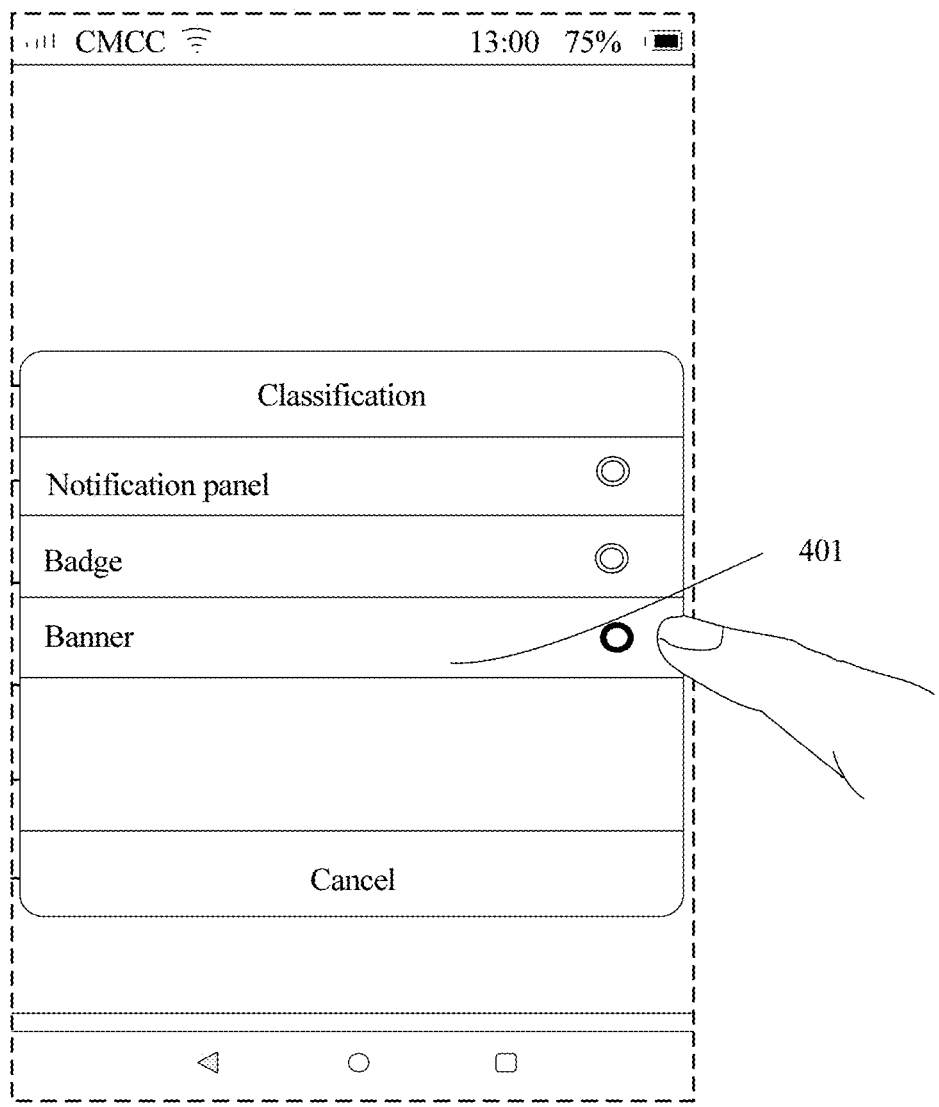
FIG. 4A is a schematic diagram of a user interface according to an embodiment of the present disclosure.
Figure 4B:
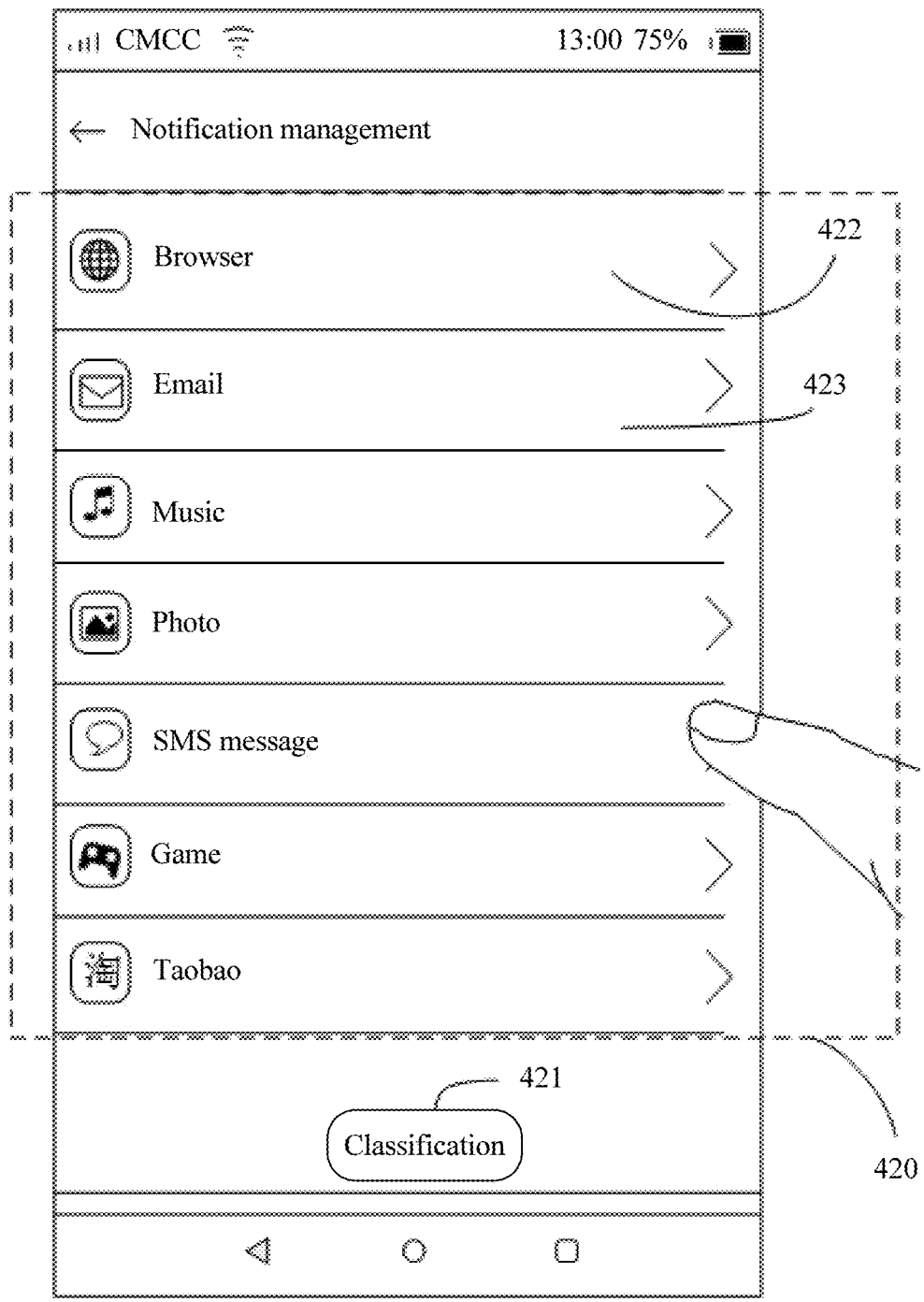
FIG. 4B to FIG. 4F are schematic diagrams of a user interface according to a scenario 1 of an embodiment of the present disclosure.
Figure 4C:
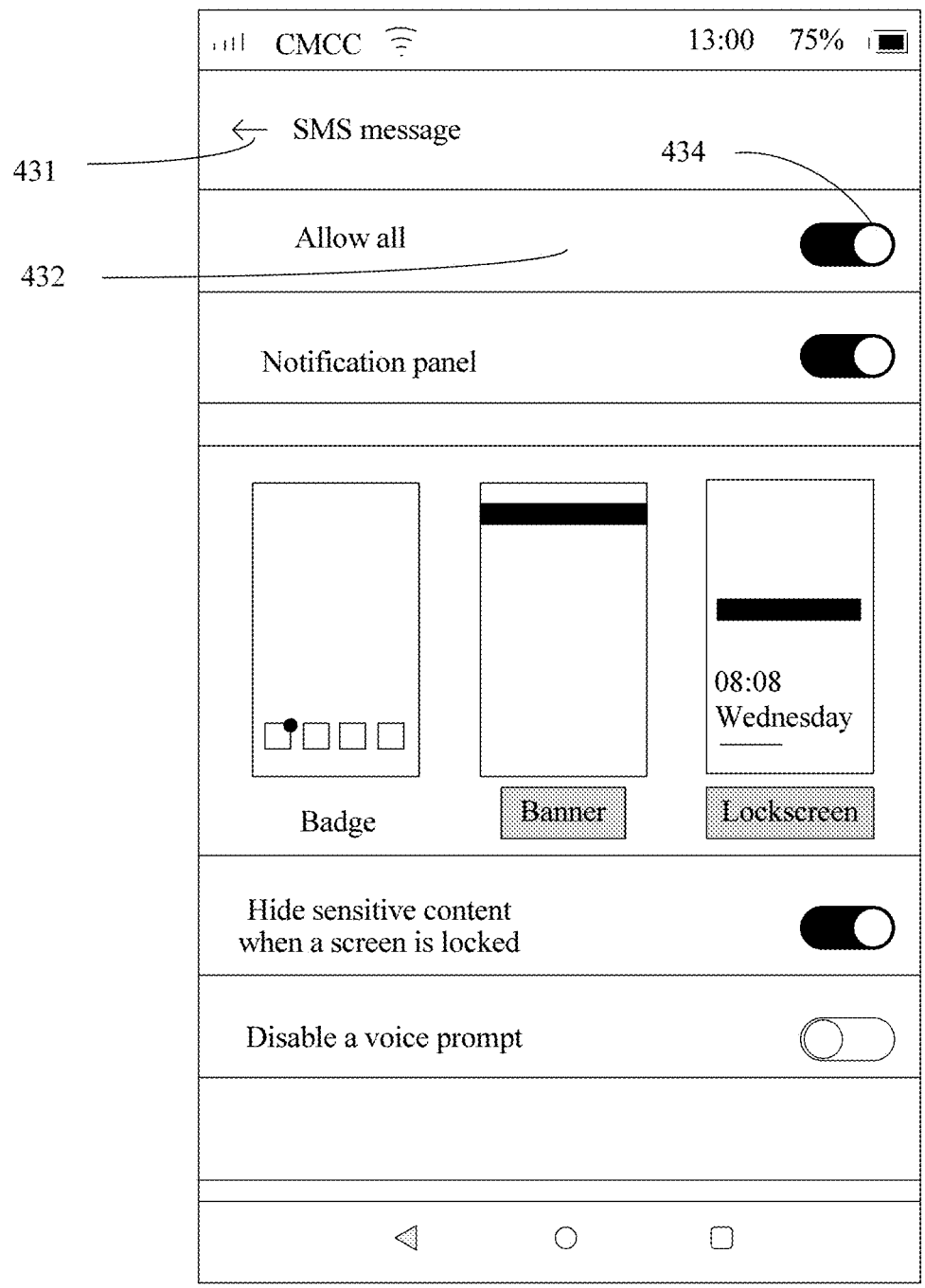
Figure 4D:
Figure 4E:
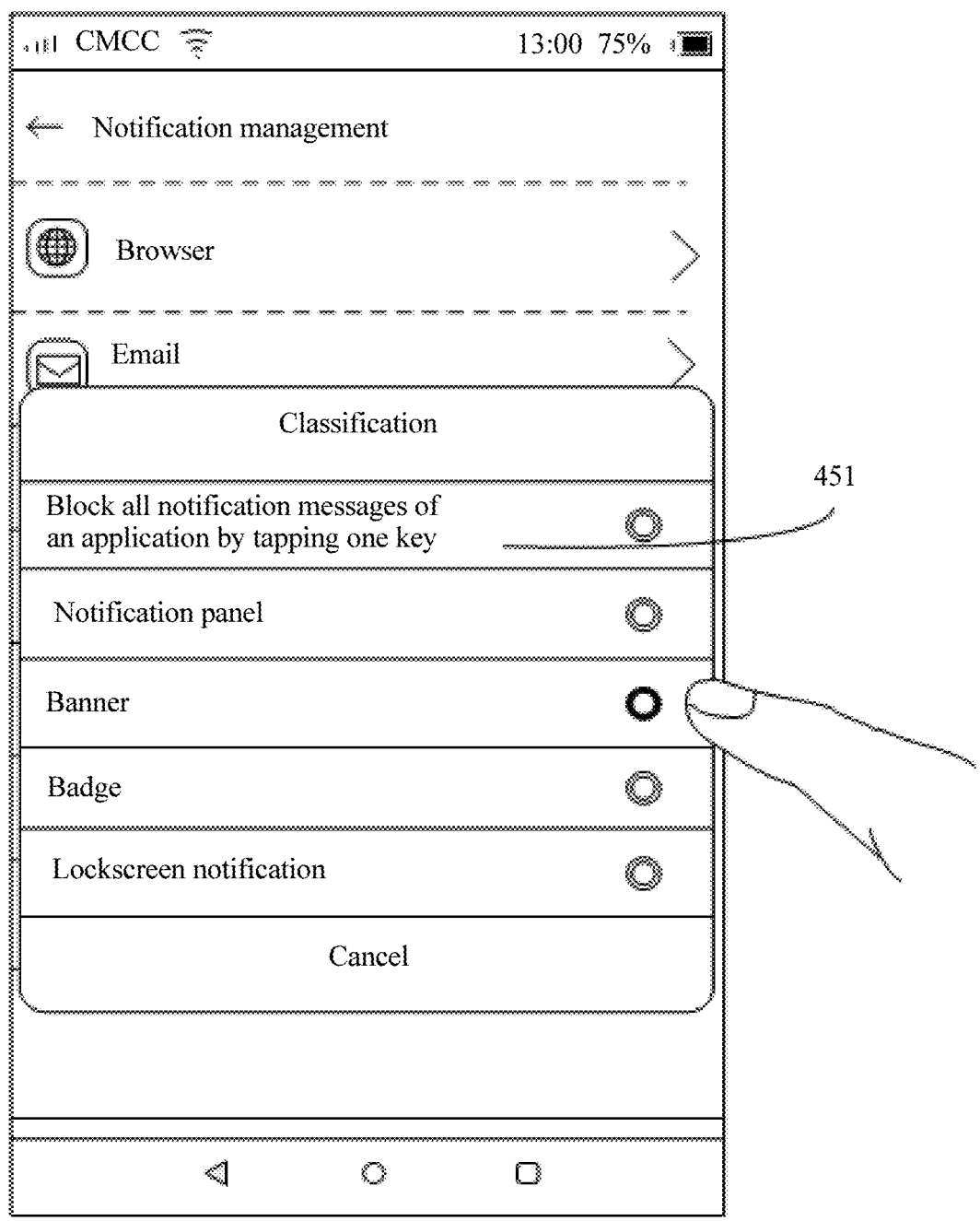
Figure 4F:
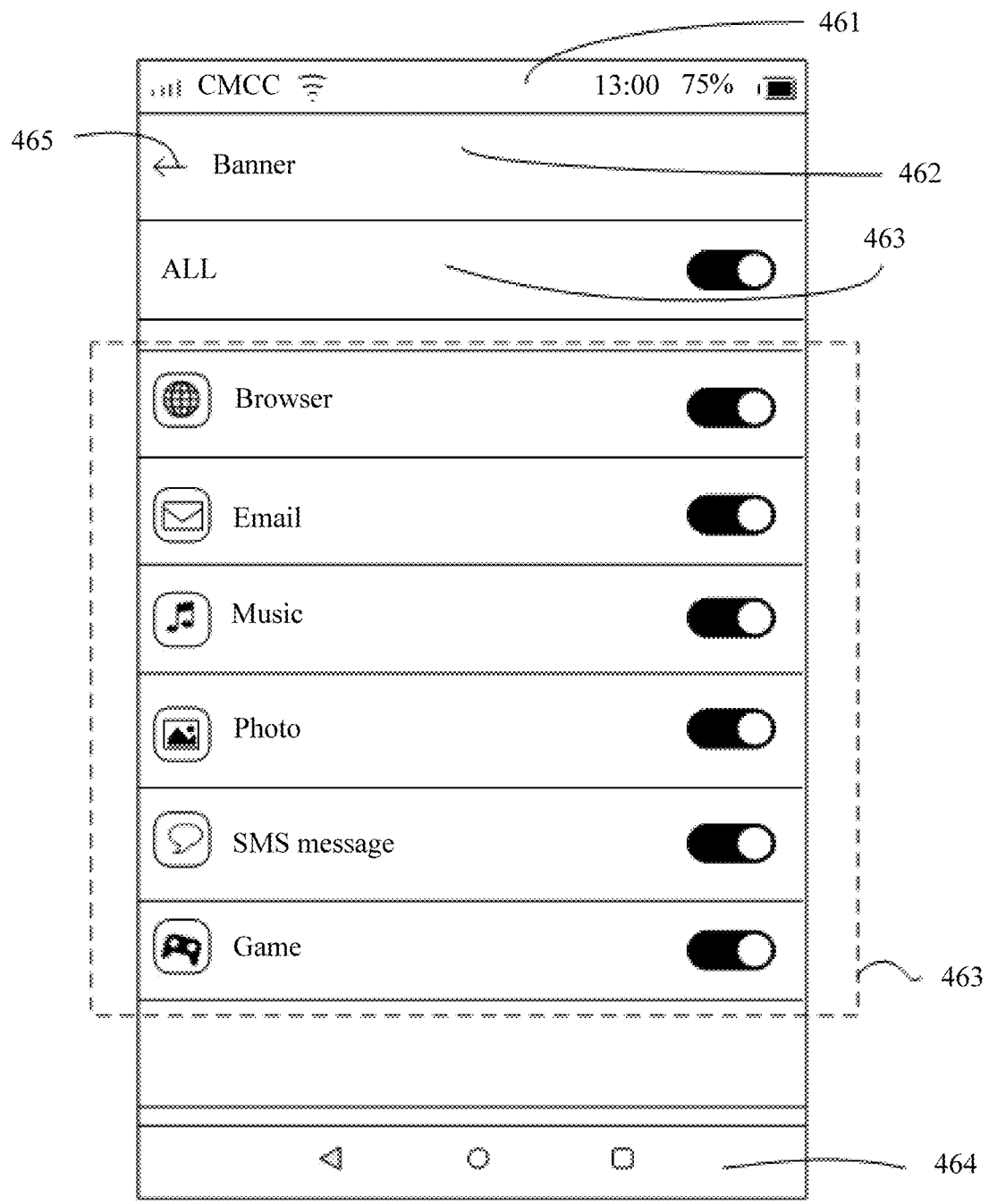

FIG. 3B is a schematic diagram of a process of managing a notification message for an application according to an embodiment of the present disclosure. 311 shows some operations for managing a prompt manner of the notification message for the application, and a user may set the prompt manner of the notification message for the application using some user interfaces shown in FIG. 4A to FIG. 4F. After the setting is completed, a processor stores a setting result into at least one data setting item in a memory (310); when determining that a new notification message arrives, the processor reads a data setting item and draws a user interface for the new notification message according to the read data setting item (312); and when determining that there is a need to draw a user interface (as shown in FIG. 4F) of a table of an application corresponding to an application type, the processor reads the data setting item and draws the user interface of the table (or an option) of the application corresponding to the application type according to the read data setting item (313).

It may be understood that before the user sets the prompt manner of the notification message for the application, a mobile phone vendor or an application provider may perform some initial settings for the prompt manner of the notification message for the application, and this is not limited in the present disclosure. When drawing the user interface, in addition to reading the data setting item in the memory, the processor may further need to read some other configuration data. For this part, refer to the other approaches, and details are not described herein again.

The data setting item is used to store a prompt manner of a notification message for each application. For example, one data setting item may store an identifier of at least one application and a switch value of whether each prompt manner of each application is enabled, as content of a data setting item 1 shown in FIG. 3B.

FIG. 3C is a schematic diagram of a mapping relationship of a UI prompt manner of a notification message for an application that is capable of providing the notification message and that is stored in a terminal, where each row represents one application, each column represents one UI prompt manner of the notification message, "on" indicates that a UI prompt manner of a notification message for this column of an application of this row is enabled, and "off" indicates that a UI prompt manner of a notification message for this column of an application of this row is disabled. The mapping relationship may be stored by at least one data item. When the processor performs a described-above step 312, for example, when the terminal draws a UI interface of a notification message for an SMS message, the processor may read the mapping relationship along a direction of X in order to determine that the SMS message should be prompted in a notification panel and a badge manner. When a described-above step 313 is performed, for example, when the processor needs to draw a user interface of a table of an application corresponding to a banner, the processor may read the mapping relationship along a direction of Y in order to determine that applications corresponding to the banner are a browser, an email, music, a photo, the SMS message, and a game.

In an implementation, when the touch panel detects an instruction for displaying the classification interface of the user (for example, an operation that the user taps a "classification" button on a notification management interface, a specific gesture of the user on a home interface, the user presses a specific virtual key, or the user presses a specific icon), the display panel displays a classification user interface shown in FIG. 4A. The classification user interface includes three application types: the banner, the badge, and the notification panel, and further includes a "cancel" button. When the touch panel detects an operation that the user taps a "banner" option 401, the processor reads the foregoing data setting item, and the display panel displays a user interface shown in FIG. 4F, that is, displays all applications whose "banner" prompt manner is enabled, and a corresponding setting button. The user may set, in this interface, whether notification messages for these applications: the browser, the email, the music, the photo, the SMS message, and the game are still to be prompted using the "banner" subsequently.

The following uses some specific scenarios for description.

Scenario 1

A processor reads content of a data setting item in a memory, and classifies, according to a UI prompt manner of a notification message for an application, all applications that are capable of providing notification messages and that are installed in the memory, including at least two of the following: enabling or disabling at least two prompt manners of the notification message by tapping one key, a lockscreen notification, a banner, a badge, a notification panel, a rolling notification, or a Toast. It may be understood that in this scenario, the application is classified according to a type of the prompt manner of the notification message for the application. Because there may be a plurality of prompt manners of a notification message for a same application, the same application may be classified into two or more application types, and this is not limited in the present disclosure.

For applications corresponding to the "enabling or disabling at least two prompt manners of the notification message by tapping one key", a toggle for a setting option of a visual prompt manner of notification messages for the applications is: whether to enable all UI prompt manners of the notification message, or whether to enable several specific UI prompt manners of the notification message (for example, may be the lockscreen notification plus the badge, or the notification panel plus the lockscreen notification plus the banner notification), and this may be set by a user or set by a mobile phone manufacturer.

The following Table 1 shows a correspondence between an application type and a setting option of the UI prompt manner of the notification message.

TABLE 1

| Application type | Switch button in the setting option of the UI prompt manner of the notification message |
|---|---|
| Enabling or disabling at least two prompt manners of the notification message by tapping one key | Whether to enable all the UI prompt manners of the notification message; or whether to enable several specific UI prompt manners of the notification message |
| Lockscreen notification | Whether to enable the lockscreen notification |
| Banner | Whether to enable the banner |
| Badge | Whether to enable the badge |
| Notification panel | Whether to enable the notification panel |
| Rolling notification | Whether to enable the rolling notification |
| Toast | Whether to enable the Toast |

The following gives descriptions with reference to FIG. 3A and FIG. 4B to FIG. 4F.

A display panel displays a non-lockscreen interface (for example, a home interface, that is, usually, a first interface that appears after unlocking). The user drops down a status bar in a non-lockscreen interface displayed in the display panel and taps a "setting" button in the status bar, and the display panel displays a plurality of sub-options of a setting. A touch panel detects that the user taps a "notification management" button, and the display panel displays a notification management interface (as shown in FIG. 4B). It may be understood that a manner of accessing the notification management interface is not limited thereto. For example, the user may further tap a "setting" icon in the home interface, and the display panel displays a plurality of sub-options of a setting. The touch panel detects that the user taps the "notification management" button, and the display panel displays the notification management interface.

A top of the user interface shown in FIG. 4B is a commonly-seen status bar, the icons included in the status bar are similar to those in FIG. 1A, and details are not described herein again. Options of a plurality of applications are under an option of notification management, and these applications are applications that have been currently installed in a mobile phone and are capable of providing notification messages. A middle of FIG. 4B includes an application table 420. This table includes a plurality of items, and from top to bottom, the items are successively a "browser" item 422, an "email" item 423, a "music" item, a "photo" item, an "SMS message" item, a "game" item, and a "Taobao" item. In addition, there further is a "classification" button 421 in a position near the bottom of the interface shown in FIG. 4B, (optionally, a "classification" item may also be added above the application table). When the touch panel detects that the user taps the "SMS message" item, the display panel displays a user interface shown in FIG. 4C. The user may set a prompt manner of an SMS message in the user interface, and a toggle 434 in an "allow all" option 432 is used to set that all prompt manners including the notification panel, the badge, the banner, the lockscreen notification, and a voice prompt are disabled, or some of all the prompt manners may be enabled. A toggle in a "notification panel" option is used to set whether to enable a prompt manner of the notification panel. A toggle in a "badge" option is used to set whether to enable a prompt manner of the badge. A toggle in a "banner" option is used to set whether to enable a prompt manner of the banner. A toggle in a "lockscreen" option is used to set whether to enable a prompt manner of the lockscreen. A toggle in a "hide sensitive content when a screen is locked" is used to set whether a notification message displayed when the screen is locked includes the sensitive content (information such as a bank account, or an amount of money). A toggle in a "disable the voice prompt" option is used to set whether to enable the voice prompt of the notification message. The bottom of FIG. 4C is a navigation bar, and details are not described herein. When the user interface after a user setting is shown in FIG. 4C, the user taps a return button 431 to exit the interface shown in FIG. 4C, and then the processor stores the prompt manner of the notification message for the SMS message to the data setting item in the memory. The prompt manner of the notification message for the SMS message is: the notification panel, the banner, the lockscreen notification, the lockscreen notification excluding the sensitive content, and the voice prompt. Because the badge is not selected by the user, the prompt manner of the badge keeps disabled.

When the touch panel detects an operation of the user for tapping the "classification" item in the user interface for notification management (as shown in FIG. 4D), the processor draws a user interface for classification of the applications according to the foregoing classification result, and the display panel displays a pop-up window for the classification. As shown in FIG. 4E, the pop-up window includes five selectable classification options: a "blocking all notification messages for the application at a time" option 451, "the notification panel", "the banner", "the badge", and "the lockscreen notification". The pop-up window further includes a "cancel" button.

When the touch panel detects an operation of the user for taping the "banner" option, the display panel displays a user interface shown in FIG. 4F.

The user interface shown in FIG. 4F includes a status bar 461, a table bar 462 of the "banner", an "ALL" option 463, an application table 463, and a navigation bar 464 according to a sequence from top to bottom. A left side of the table bar of the banner includes a return button 465 of an arrow shape, and the return button 465 is used to return to the user interface shown in FIG. 4E. When a toggle in the "ALL" option is disabled, the processor disables the prompt manner of the banner of the notification message of one type of application. The prompt manner of the banner of this type of application is currently enabled. When the toggle in the ALL option is enabled, the user may choose whether to enable the prompt manner of the banner of each application in this type of application. The application table includes all options of this type of application: a "browser" option, an "email" option, a "music" option, a "photo" option, an "SMS message" option, and a "game" option. An option of each application includes an application icon, an application name, and a toggle that is used to set whether to disable the banner prompt manner of the notification message for the application and that is located on a right side of the option. When the user interface after the user setting is shown in FIG. 4F, and the user taps the return button to exit the user interface shown in FIG. 4F, the processor stores the setting about the prompt manner of the banner of this type of application to the data setting item in the memory.

It should be noted that an example in which only the "SMS message" option is selected is used in FIG. 4B and FIG. 4C. If an option of another application is selected, a setting interface for a prompt manner of a notification message for the other application is similar to that in FIG. 4C.

Similarly, the user interface in FIG. 4E is merely an example. The pop-up window of the classification may also include only four classifications: the "notification panel", the "banner", the "badge", and the "lockscreen notification", and further includes the "cancel" button.

Likewise, an example in which only the "banner" option is selected is used in FIG. 4E and FIG. 4F. When another classification option is selected, a setting interface for a prompt manner of a notification message for an application corresponding to the other classification option is similar to that in FIG. 4F. For example, if the "blocking all notification messages for the application at a time" option is selected, options of all applications corresponding to the "blocking all notification messages for the application at a time" are displayed. An option of each application includes an application icon, an application name, and a toggle that is used to set whether to disable all UI prompt manners of a notification message for the application and that is located on a right side of the option. If a result after the user setting is that all the UI prompt manners of the notification message for the application are disabled, subsequently all notification messages for the application are not prompted in a UI manner. If a result after the user setting is that all the UI prompt manners of the notification message for the application are not disabled, the user may further separately set the UI prompt manners of the notification messages for the application using another setting manner. For example, the user may choose, according to a requirement of the user, to enable some UI prompts and disable some other UI prompts.

Scenario 2

A processor classifies, according to an application type, all applications that are capable of providing notification messages and that have been installed in a memory. The application type is classifying all the applications according to frequency that a notification message for an application is opened by a user, including daily attention, weekly attention, and monthly attention, and basically no attention. By counting a quantity of times of opening the notification message within a period of time of using a terminal by the user, the application may be classified according to the frequency that the notification message for the application is opened by the user. A prompt manner of the notification message counted herein includes all UI prompt manners.

Figure 5A:
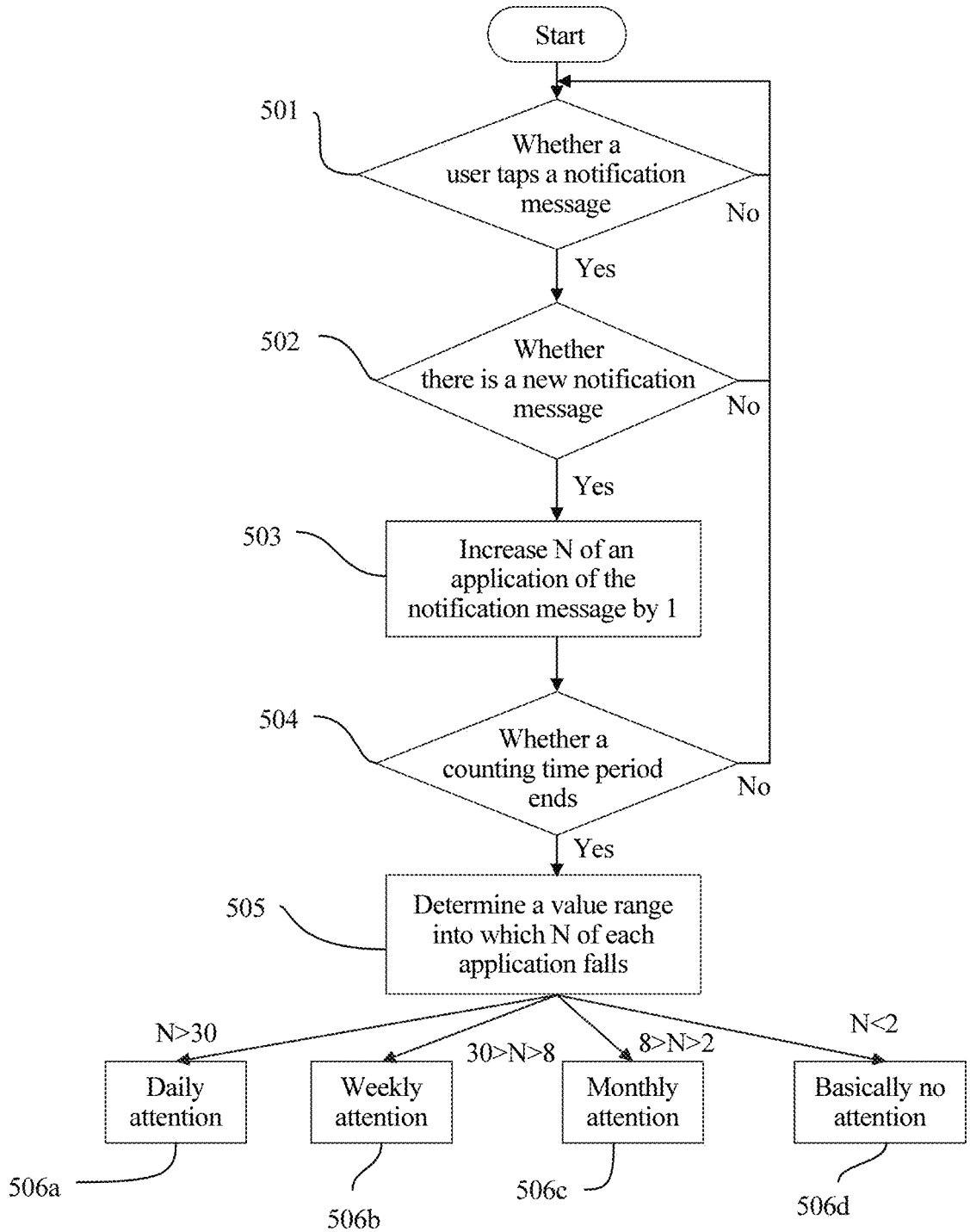
FIG. 5A is a flowchart of a method for classifying an application according to a scenario 2 of an embodiment of the present disclosure.

In an implementation, a quantity of times N of opening the notification message for the application by the user in one month may be counted using a method shown in FIG. 5A, and the method shown in FIG. 5A includes the following steps.

501. After a time period used to count a notification message for an application starts, a processor determines whether there is a new notification message for the application.

For example, the processor determines whether an RF circuit receives a new notification message for the application sent by an application server, or the processor determines whether the processor generates a new notification message. If there is a new notification message, the processor performs step 502; and if there is no new notification message, the processor continues to perform step 501.

502. The processor determines whether a user has read the new notification message, and this may be: the processor determines, according to feedback of a touch panel, whether the user taps the new notification message. If the new notification message is tapped, the processor performs 503; and if the new notification message is not tapped, the processor performs step 501.

503. The processor increases N of the application corresponding to the new notification message by 1. After the time period used to count the notification message for the application starts, an initial value of N is 0.

504. The processor determines whether the time period used to count the notification message for the application ends. If the time period ends, the processor performs step 505; and if the time period does not end, the processor performs step 501. It may be understood that this step may also be performed before step 501, and the processor starts to perform step 501 only when the time period does not end.

505. After the time period used to count the notification message for the application ends, the processor determines a value range into which N of each application falls. For details, refer to a value range in Table 2. Table 2 further provides a toggle for an option of a UI prompt manner of a notification message corresponding to each application type. A "whether to disable all UI prompt manners of the notification message" option may be further replaced with a "whether to enable all UI prompt manners of the notification message" option, or be replaced with "whether to enable one specific UI prompt manner of the notification message", or be replaced with "whether to enable several specific UI prompt manners of the notification message". This is not limited in this embodiment of the present disclosure.

TABLE 2

| Quantity of times N of opening the notification message for the application by the user in one month | Application type | Switch button for the option of the UI prompt manner of the notification message |
|---|---|---|
| N > 30 | Daily attention | Whether to disable all the UI prompt manners of the notification message |
| 8 < N < 30 | Weekly attention | Whether to disable all the UI prompt manners of the notification message |
| 2 < N < 8 | Monthly attention | Whether to disable all the UI prompt manners of the notification message |
| N < 2 | Basically no attention | Whether to disable all the UI prompt manners of the notification message |

506a. When N of an SMS message is greater than 30, the processor determines that the application type of the SMS message is "daily attention", and steps 506b to 506d are deduced by analogy. For details, refer to FIG. 5A and Table 2, and details are not described herein again.

It may be understood that the value range provided in the foregoing method is merely an example. When N=30, the application may be classified, according to a requirement, that the application belongs to which application type close to "daily attention" or close to "weekly attention". Persons skilled in the art may further set another value according to an actual requirement, and this is not limited in the present disclosure.

It should be noted that after the foregoing application type is determined, the processor stores, in the memory, a correspondence between an application type corresponding to each application and an identifier of the application. When needing to draw a table interface of an application corresponding to an application type, the processor reads the application type of each application or the correspondence to draw the table interface of the application corresponding to the application type.

Figure 5B:
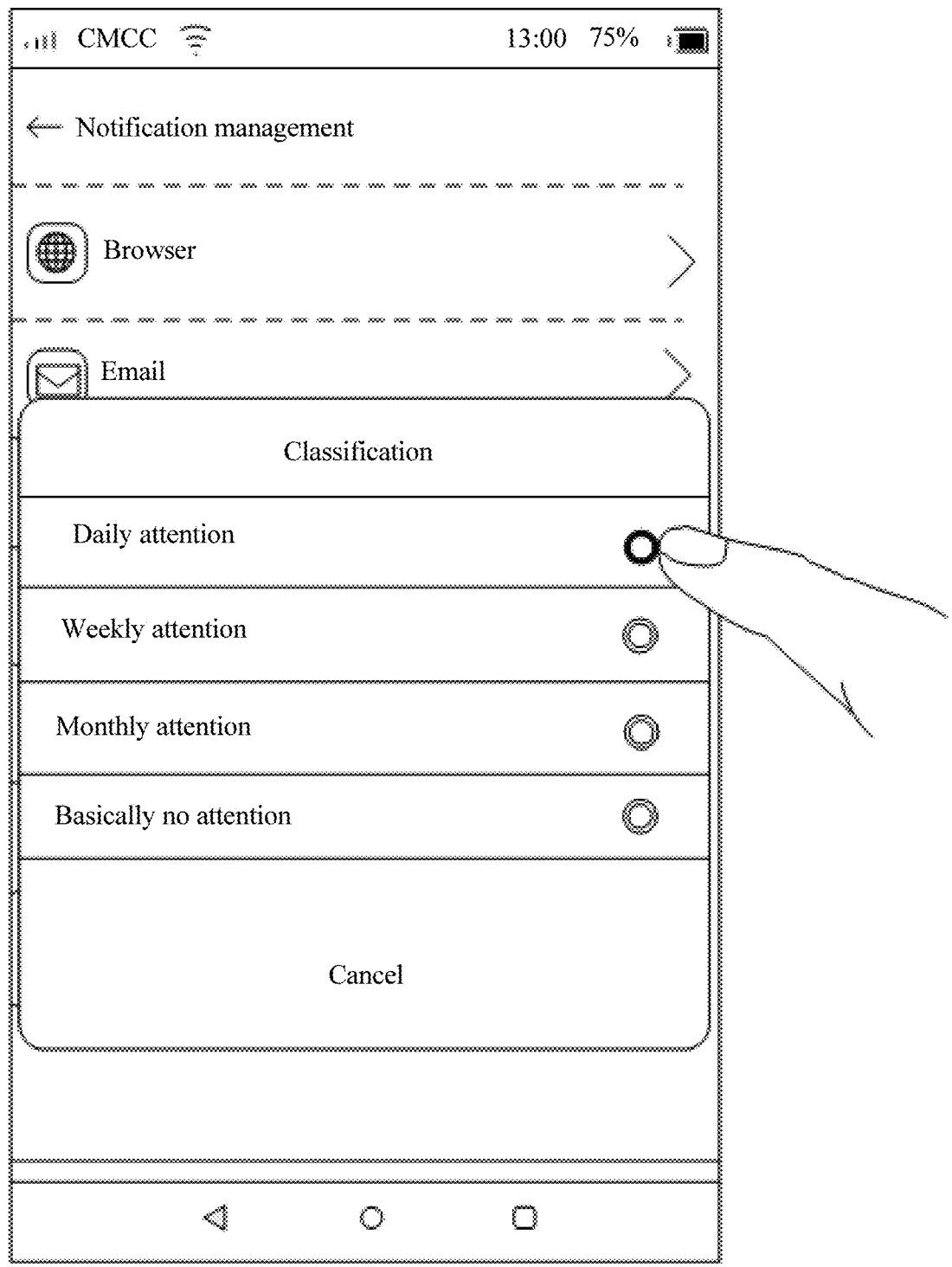
FIG. 5B and FIG. 5C are schematic diagrams of a user interface according to a scenario 2 of an embodiment of the present disclosure.
Figure 5C:
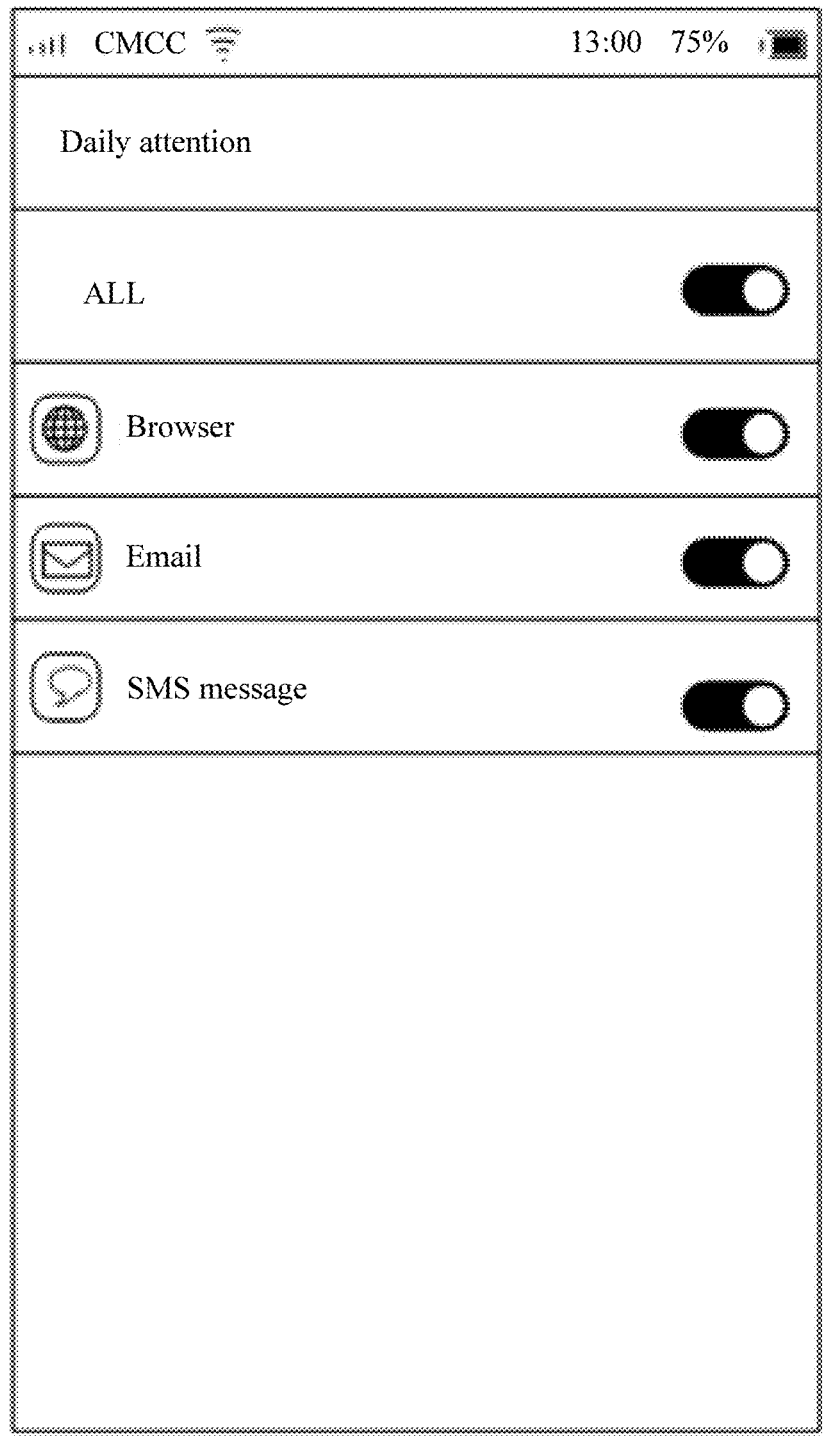

The following gives a description with reference to FIG. 4D, FIG. 5B, and FIG. 5C.

In the scenario 2, when the touch panel detects that the user taps a "classification" button in an interface for notification management shown in FIG. 4D, the processor draws a user interface for classification of the application according to a classification result of the application in the foregoing steps 501 to 506 and a display panel displays a pop-up window for classification shown in FIG. 5B. The pop-up window includes five selectable classification options: a "daily attention" option, a "weekly attention" option, a "monthly attention" option, and a "basically no attention" option, and the pop-up window further includes a cancel button.

When the touch panel detects that the user selects the "daily attention" option in the interface shown in FIG. 5B, the touch panel displays a user interface shown in FIG. 5C, and the user interface includes a status bar, a "daily attention" table bar, an "ALL" option, an application table, and a navigation bar according to a sequence from top to bottom. A left side of the "daily attention" table bar includes a return button of an arrow shape, and the return button is used to return to the user interface shown in FIG. 5B. When a toggle of the "ALL" option is disabled, the processor disables a UI prompt manner of a notification message for all applications whose application type is "daily attention". When a toggle of the ALL option is enabled, the user may choose whether to enable a UI prompt manner of a notification message for each application of all applications corresponding to the "daily attention". An application table in FIG. 5C includes options of all applications whose application type is "daily attention": a "browser" option, an "email" option, and an "SMS message" option. An option of each application includes an application icon, an application name, and a toggle that is used to set whether to disable all UI prompt manners of the notification message for the application and that is located on a right side of the option. When the user interface after the user setting is shown in FIG. 5C, and the user taps the return button to exit the user interface shown in FIG. 5C, the processor stores, to a data setting item in the memory, the setting that all the UI prompt manners of applications whose application type is "daily attention" are disabled.

Scenario 3

A processor classifies, according to a quantity of notification messages for an application within a period of time, all applications that have been installed in a memory and that are capable of providing notification messages. These application types include: frequently providing a notification message, often providing a notification message, occasionally providing a notification message, and basically providing no notification message. The application may be classified according to the quantity of notification messages for the application by counting the quantity of notification messages for the application within the period of time. A prompt manner of the notification message herein includes all UI prompt manners.

Figure 6A:
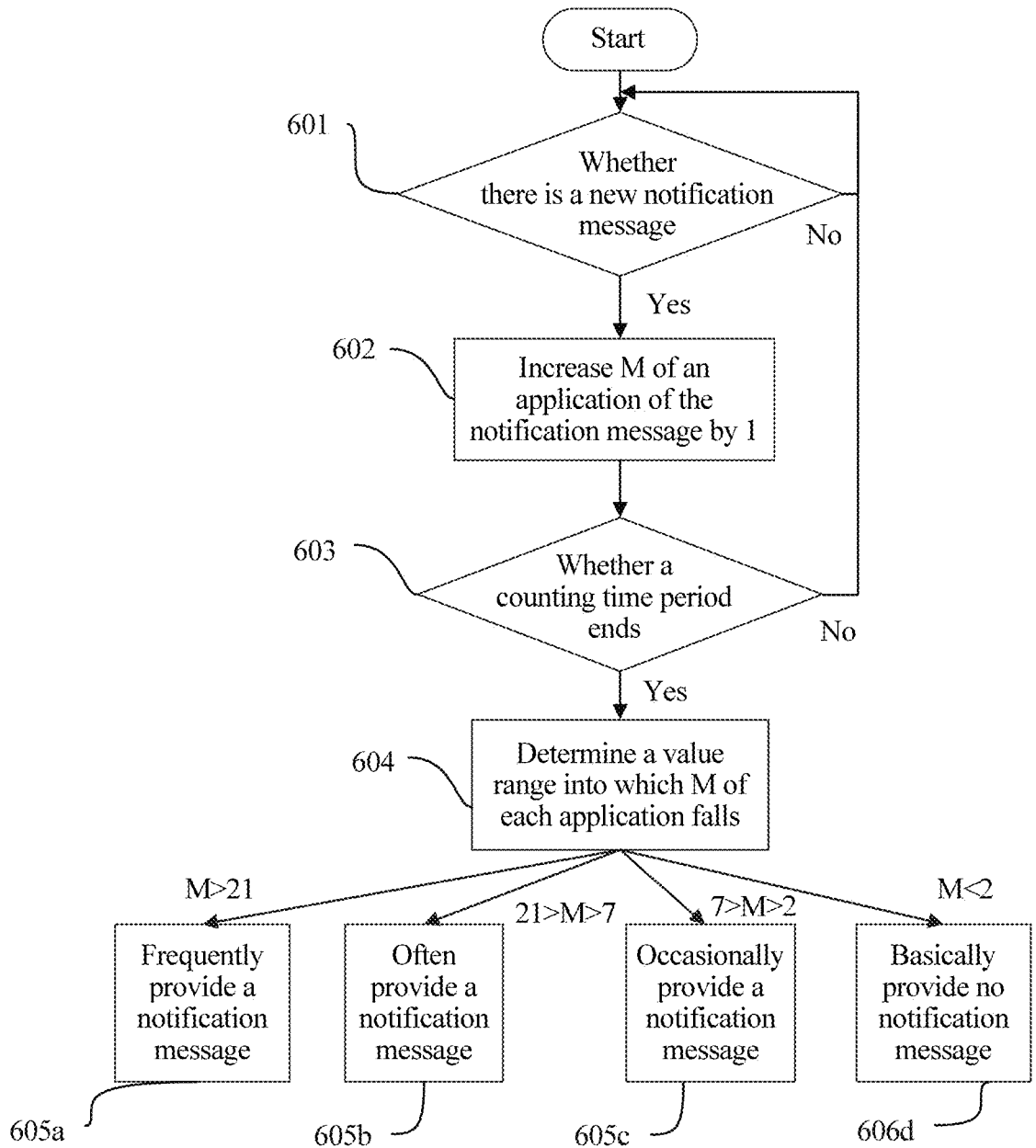
FIG. 6A is a flowchart of a method for classifying an application according to a scenario 3 of an embodiment of the present disclosure.

In an implementation, the quantity M of notification message for the application in one month may be counted using a method shown in FIG. 6A, and the method shown in FIG. 6A includes the following steps.

601. After a time period used to count a notification message for an application starts, a processor determines whether there is a new notification message for the application.

A determining method is similar to step 501, and is not repeated herein. If there is the new notification message, the processor performs step 602; and if there is no new notification message, the processor continues to perform step 601.

602. The processor increases M of the application corresponding to the new notification message by 1. After the time period used to count the notification message for the application starts, an initial value of M is 0.

603. The processor determines whether the time period used to count the notification message for the application ends. If the time period ends, the processor performs step 604; and if the time period does not end, the processor performs step 601. Similar to step 504, this step may also be performed before step 601, and the processor starts to perform step 601 only when the time period does not end.

604. After the time period used to count the notification message for the application ends, the processor determines a value range into which N of each application falls. For details, refer to a value range in Table 3. Table 3 further provides a toggle for an option of a UI prompt manner of a notification message corresponding to each application type. A "whether to enable all UI prompt manners of the notification message" option may also be replaced with a "whether to disable all UI prompt manners of the notification message" option, or be replaced with "whether to enable one specific UI prompt manner of the notification message", or be replaced with "whether to enable several specific UI prompt manners of the notification message". This is not limited in this embodiment of the present disclosure.

TABLE 3

| Quantity M of notification messages | Application type | Switch button for the option of the UI prompt manner of the notification message |
|---|---|---|
| M > 21 | Frequently providing the notification message | Whether to enable all the UI prompt manners of the notification message |
| 7 < M < 21 | Often providing the notification message | Whether to enable all the UI prompt manners of the notification message |
| 2 < M < 7 | Occasionally providing the notification message | Whether to enable all the UI prompt manners of the notification message |
| M < 2 | Basically providing no notification message | Whether to enable all the UI prompt manners of the notification message |

605a. When M of an email is greater than 21, the processor determines that the application type of the email is "frequently providing the notification message", and steps 605b to 605d are deduced by analogy. For details, refer to FIG. 6A and Table 6, and details are not described herein again.

It should be noted that the value range provided in Table 3 is merely an example. When M=7, the application may be classified, according to a requirement, that the application belongs to the application type of "occasionally providing the notification message" or "often providing the notification message". Persons skilled in the art may further set another value according to an actual requirement, and this is not limited in the present disclosure.

It should be noted that after the foregoing application type is determined, the processor stores, in the memory, a correspondence between an application type corresponding to each application and an identifier of the application. When needing to draw a table interface of an application corresponding to an application type, the processor reads the application type of each application or the correspondence to draw the table interface of the application corresponding to the application type.

Figure 6B:
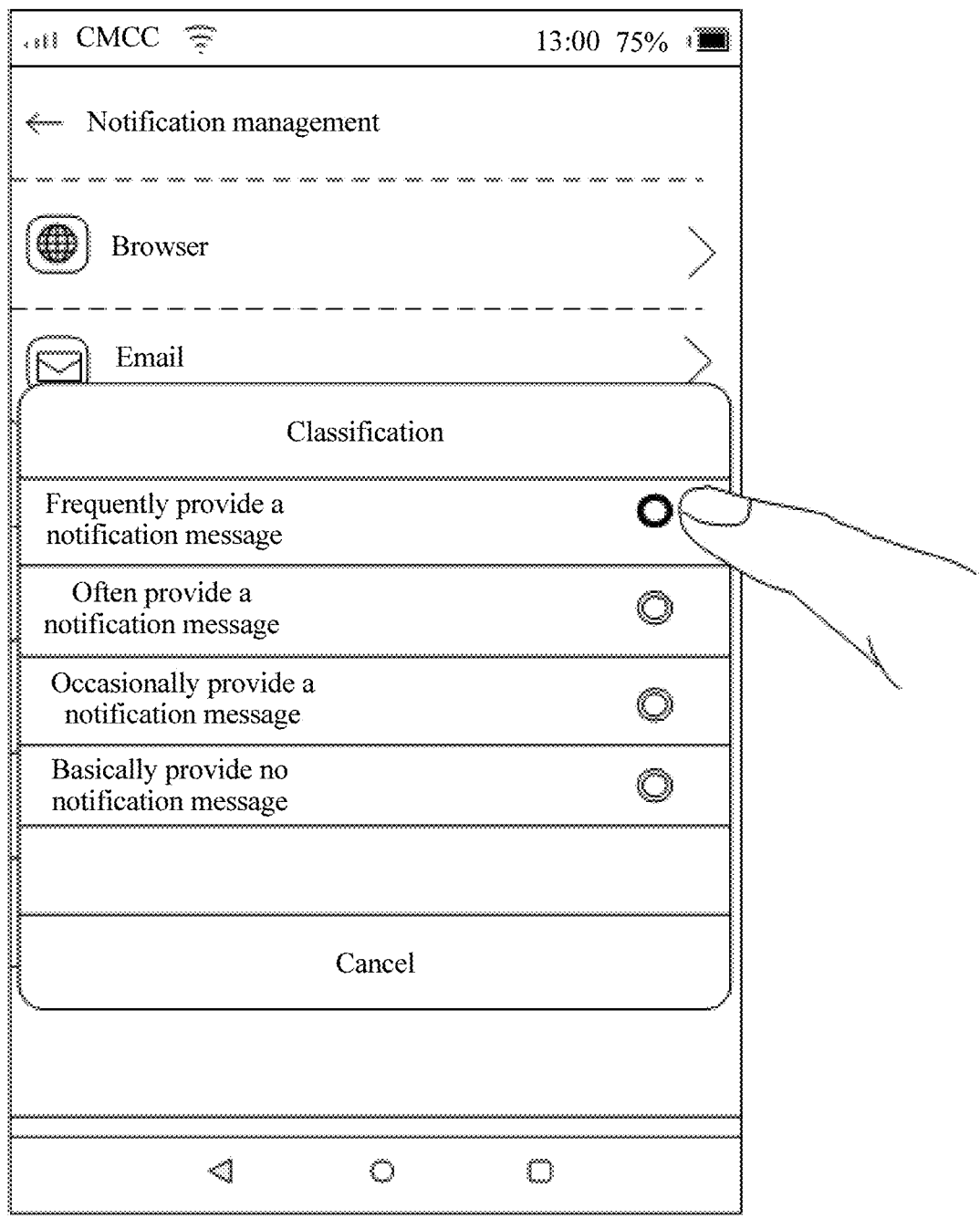
FIG. 6B and FIG. 6C are schematic diagrams of a user interface according to a scenario 3 of an embodiment of the present disclosure.
Figure 6C:
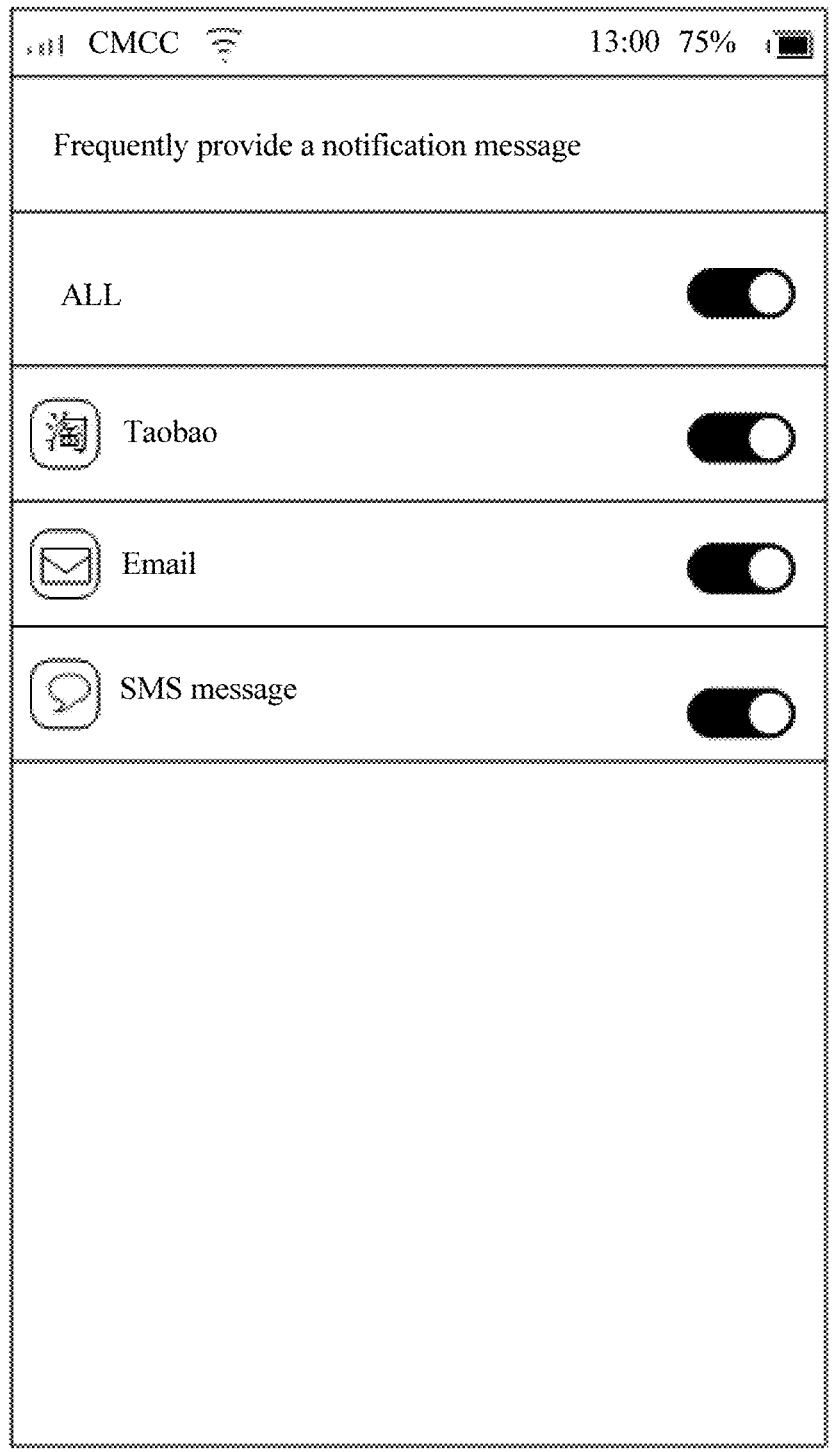

The following gives a description with reference to FIG. 4D, FIG. 6B, and FIG. 6C.

In the scenario 3, when the touch panel detects that the user taps a "classification" button in an interface for notification management shown in FIG. 4D, the processor draws a user interface for classification of the application according to a classification result of the application in the foregoing steps 601 to 605 and a display panel displays a pop-up window for classification shown in FIG. 6B. The pop-up window includes five selectable classification options: a "frequently providing the notification message" option, an "often providing the notification message" option, an "occasionally providing the notification message" option, and a "basically providing no notification message" option, and the pop-up window further includes a cancel button.

When the touch panel detects that the user selects the "frequently providing the notification message" option in the interface shown in FIG. 6B, the touch panel displays a user interface shown in FIG. 6C. The user interface includes a status bar, a "frequently providing the notification message" table bar, an "ALL" option, and an application table, and a navigation bar according to a sequence from top to bottom. A left side of the "frequently providing the notification message" table bar includes a return button of an arrow shape, and the return button is used to return to the user interface shown in FIG. 6B. When a toggle of the "ALL" option is disabled, the processor disables a UI prompt manner of a notification message for all applications whose application type is "frequently providing the notification message". When a toggle of the ALL option is enabled, the user may choose whether to enable a UI prompt manner of a notification message for each application of all applications whose application type is "frequently providing the notification message". An application table in FIG. 6C includes options of all applications whose application type is "frequently providing the notification message": a "Taobao" option, an "email" option, and an "SMS message" option. An option of each application includes an application icon, an application name, and a toggle that is used to set whether to enable all UI prompt manners of the notification message for the application and that is located on a right side of the option. When the user interface after the user setting is shown in FIG. 6C, and the user taps the return button to exit the user interface shown in FIG. 6C, the processor stores, to a data setting item in the memory, the setting that all the UI prompt manners of applications whose application type is "frequently providing the notification message" are enabled.

Scenario 4

Different from the foregoing scenarios, in this scenario, a processor classifies, according to a UI prompt manner of a notification message, an application of a prompt of the notification message currently being displayed. Because a lockscreen notification is usually displayed only in a lockscreen interface, after a mobile terminal is unlocked, the lockscreen notification is not displayed. When the notification message just arrives, a banner usually performs a prompt. The two types of prompts are usually difficult to continuously exist. Therefore, the application of the prompt of the notification message currently being displayed may be classified into the following two types: currently prompting the notification message in a notification panel, and currently prompting the notification message using a badge. It may be understood that the application of the prompt of the notification message currently being displayed may also be classified according to a UI prompt manner of another notification message.

Figure 7A:
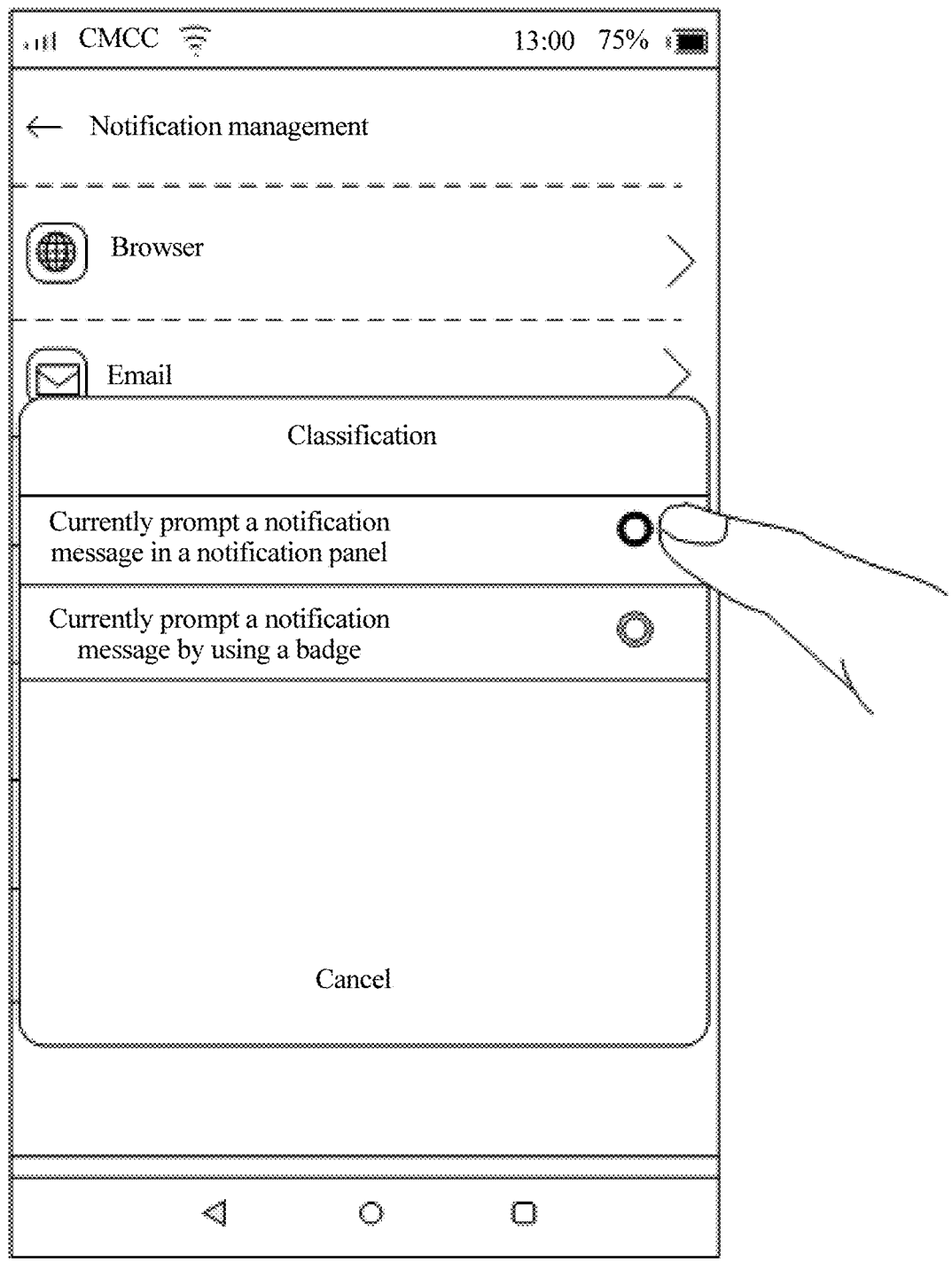
FIG. 7A and FIG. 7B are schematic diagrams of a user interface according to a scenario 4 of an embodiment of the present disclosure.

When a touch panel detects that a user taps a "classification" option in a user interface shown in FIG. 4D, a display panel displays a pop-up window shown in FIG. 7A. The pop-up window includes the "currently prompting the notification message in the notification panel" option and the "currently prompting the notification message using a badge" option, and further includes a "cancel" button. When the touch panel detects that the user taps the "currently prompting the notification message in the notification panel" option in the user interface shown in FIG. 7A, the processor reads a display status of notification messages of all applications, identifies an application that is currently prompting the notification message in the notification panel, and draws a user interface shown in FIG. 7B.

Figure 7B:
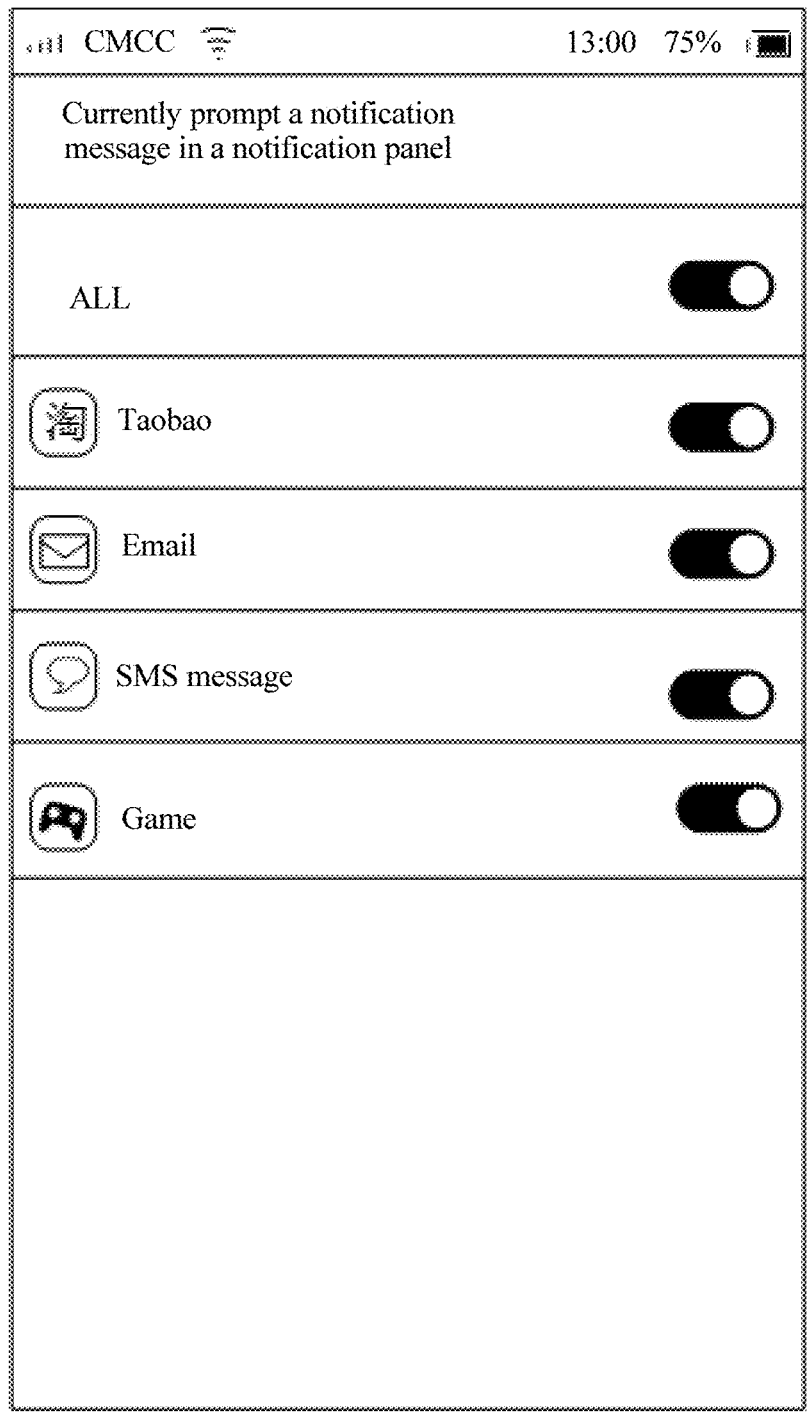

The user interface shown in FIG. 7B includes a status bar, a "currently prompting the notification message in the notification panel" table bar, an "ALL" option, an application table, and a navigation bar according to a sequence from top to bottom. A left side of the "currently prompting the notification message in the notification panel" table bar includes a return button of an arrow shape, and the return button is used to return to the user interface shown in FIG. 6A. When a toggle of the "ALL" option is disabled, the processor disables a UI prompt manner of a notification message for all applications whose application type is "currently prompting the notification message in the notification panel". When a toggle of the ALL option is enabled, the user may choose whether to enable a UI prompt manner of a notification message for each application of all applications whose application type is "currently prompting the notification message in the notification panel". An application table in FIG. 7B includes options of all applications whose application type is "currently prompting the notification message in the notification panel": a "Taobao" option, an "email" option, an "SMS message" option, and an "email" option. An option of each application includes an application icon, an application name, and a toggle that is used to set whether to enable all UI prompt manners of the notification message for the application and that is located on a right side of the option. When the user interface after the user setting is shown in FIG. 7B, and the user taps the return button to exit the user interface shown in FIG. 7B, the processor stores, to a data setting item in the memory, the setting that all the UI prompt manners of applications whose application type is "currently prompting the notification message in the notification panel" are enabled.

It may be understood that the user interface shown in FIG. 7B may be further used by the user to set whether to clear the notification message in the notification panel. When the "ALL" option is disabled, the processor clears notification messages in the notification panel for all applications whose application type is "currently prompting the notification message in the notification panel". When the ALL option is enabled, the user may choose whether to clear a notification message in the notification panel for each of all applications whose application type is "currently prompting the notification message in the notification panel". Correspondingly, an option of each application includes an application icon, an application name, and a button that is used to set whether to clear the notification message currently being displayed in the notification panel for the application and that is located on a right side of the option. When the user interface after the user setting is shown in FIG. 7B, and the user taps the return button to exit the user interface shown in FIG. 7B, the processor clears the notification messages in the notification panel for all the applications whose application type is "currently prompting the notification message in the notification panel". When the touch panel detects a user-input operation for accessing the notification panel, the display panel displays a user interface for the notification panel from which all notification messages are cleared.

It should be noted that the terminal may support only one of the scenario 1 to the scenario 4, that is, there is only one classification criterion for an application. In this case, when the touch panel detects that the user selects the "classification" option, the display panel displays a user interface for application classification shown in FIG. 4E, FIG. 5B, FIG. 6B, or FIG. 7A. The terminal may also support at least two of the scenario 1 to the scenario 4. In this case, there are at least two classification criteria for the application, and an option for each of the at least two classification criteria may be provided in an interface for notification management, or another user interface, and the user chooses to use a specific classification criterion to classify the application.

In the foregoing implementations, the touch panel may also be replaced with another input unit. Various instructions and gestures may be customized by the user, or may be set by a terminal vendor or an application provider. The instructions or the gestures may be implemented in a plurality of manners, for example, tap, double tap, touch and hold, drag, slide, and swipe. Layout of the foregoing various user interfaces is merely an example, and a specific implementation is not limited in the present disclosure.

The foregoing descriptions are merely example embodiments of the present disclosure, but are not intended to limit the protection scope of the present disclosure. Any equivalent modifications made according to the claims of the present disclosure still fall within the scope of the present disclosure.

What is claimed is:

1. An electronic device, comprising:
   a touch sensitive display panel;
   at least one processor; and
   a memory comprising one or more programs configured to be executed by the at least one processor to cause the electronic device to:
      detect a first input;
      display a first graphical user interface (GUI) for notification management in response to the first input, wherein the first GUI displays a classification item;
      detect a second input on the classification item in the first GUI;
      in response to the second input, display a first application type for a first plurality of applications and a second application type for a second plurality of applications, wherein the first application type is different than the second application type;
      detect a third input on the first application type;
      in response to the third input, display a second GUI for notification management, wherein the second GUI displays a first identifier of a first application corresponding to the first application type, a second identifier of a second application corresponding to the first application type, a first toggle and a second toggle;
      detect a fourth input on the first toggle;
      in response to the fourth input, enable a first set of notification message prompt manners, wherein the first set of notification message prompt manners for the first application is settable by a user;
      detect a fifth input on the second toggle; and
      in response to the fifth input, enable a second set of notification message prompt manners, wherein the second set of notification message prompt manners for the second application is settable by a user.

2. The electronic device of claim 1, wherein the first set of notification message prompt manners comprises one or more of the following: a lockscreen notification, a banner, a badge, a notification panel, a rolling notification, or a toast.

3. The electronic device of claim 1, wherein the first set of notification message prompt manners comprises one or more of the following: a pop-up window or a badge.

4. The electronic device of claim 1, wherein the first set of notification message prompt manners comprises one or more of the following: a notification panel, a lockscreen notification, or a banner.

5. The electronic device of claim 1, wherein the first application type corresponds to a first type of applications frequently providing notification messages, or the first application type corresponds to a second type of applications often providing notification messages, or the first application type corresponds to a third type of applications occasionally providing notification messages, or the first application type corresponds to a fourth type of applications basically providing no notification message.

6. The electronic device of claim 1, wherein the first application type is classified according to at least one of: a first frequency that an application provides a plurality of notification messages, a second frequency that indicates that the notification messages for the application are read, or a prompt manner of another notification message for the application currently being prompted.

7. The electronic device of claim 1, wherein the second application type is classified according to at least one of: a first frequency that an application provides a plurality of notification messages, a second frequency that indicates that the notification messages for the application are read, or a prompt manner of another notification message for the application currently being prompted.

8. The electronic device of claim 1, wherein the second application type corresponds to a first type of applications for which all notification messages can be blocked at a same time, or the second application type corresponds to a second type of applications prompted with a lockscreen notification, or the second application type corresponds to a third type of applications prompted with a banner, or the second application type corresponds to a fourth type of applications prompted with a badge, or the second application type corresponds to a fifth type of applications prompted with a notification panel, or the second application type corresponds to a sixth type of applications prompted with a rolling notification, or the second application type corresponds to a seventh type of applications prompted with a toast.

9. The electronic device of claim 1, wherein the electronic device is further caused to:
   detect a sixth input on a first application item of a plurality of application items in the first GUI, wherein the first application item corresponds to a third application; and
   in response to the sixth input, display a third GUI for setting a prompting manner of a notification message for the third application, wherein the third GUI comprises a third toggle capable of disabling all prompt manners of the notification message for the third application, and a fourth toggle capable of disabling a badge prompt manner for the third application.

10. The electronic device of claim 1, wherein the classification item is located above a plurality of application items.

11. An electronic device, comprising:
    a touch sensitive display panel;
    at least one processor;
    a memory; and
    one or more programs stored in the memory and configured to be executed by the at least one processor to cause the electronic device to:
       detect a first input;
       display a first graphical user interface (GUI) for notification management in response to the first input, wherein the first GUI displays a classification item;
       detect a second input on the classification item in the first GUI;
       in response to the second input, display a first application type for a first plurality of applications and a second application type for a second plurality of applications, wherein the first application type is different than the second application type;
       detect a third input on the first application type;
       in response to the third input, display in a second GUI for notification management, wherein the second GUI displays a first identifier of a first application corresponding to the first application type, a second identifier of a second application corresponding to the first application type, a first toggle and a second toggle;
       detect a fourth input on the first toggle;
       in response to the fourth input, disable all GUI notification message prompt manners for the first application;

detect a fifth input on the second toggle; and
in response to the fifth input, disable all GUI notification message prompt manners for the second application.

12. The electronic device of claim 11, wherein the first GUI notification message prompt manners comprise at least two of the following: a lockscreen notification, a banner, a badge, a notification panel, a rolling notification, or a toast, and wherein the second GUI notification message prompt manners comprise at least two of the lockscreen notification, the banner, the badge, the notification panel, the rolling notification, or the toast.

13. The electronic device of claim 11, wherein the first application type corresponds to a first type of applications frequently providing notification messages, a second type of applications often providing notification messages, a third type of applications occasionally providing notification messages, or a fourth type of applications basically providing no notification message.

14. The electronic device of claim 11, wherein the first application type is classified according to at least one of: a first frequency that an application provides a plurality of notification messages, a second frequency that indicates that the notification messages for the application are read, or a prompt manner of another notification message for the application currently being prompted.

* * * * *